United States Patent [19]
Kirka et al.

[11] Patent Number: 5,706,627
[45] Date of Patent: Jan. 13, 1998

[54] CONTROL SYSTEM FOR A PACKAGING MACHINE

[75] Inventors: Arde Kirka, Algonquin; Anders Ek, Chicago; Johan Hegardt, Buffalo Grove, all of Ill.; Robert Massey, Paddock Lake, Wis.; Olof Stark, Ystad; Gunnar Drevfors, Akarp, both of Sweden; Ashok Singh, Chicago, Ill.

[73] Assignee: Tetra Laval Holdings & Finance, S.A., Pully, Switzerland

[21] Appl. No.: 315,414

[22] Filed: Sep. 28, 1994

Related U.S. Application Data

[63] Continuation-in-part of Ser. No. 190,546, Feb. 2, 1994, Pat. No. 5,488,812.

[51] Int. Cl.$^6$ .................. B65B 57/100; B65B 3/04; B65B 51/10; B65B 43/26
[52] U.S. Cl. .................. 53/52; 53/55; 53/75; 53/266.1; 53/565; 53/371.3; 493/2; 493/18; 493/30
[58] Field of Search .................. 53/55, 64, 75, 53/52, 565, 266.1, 467, 458, 381.1, 201, 202; 493/1, 2, 3, 30, 17, 18

[56] References Cited

U.S. PATENT DOCUMENTS

| | | |
|---|---|---|
| 4,419,761 | 12/1983 | Kuze . |
| 4,588,391 | 5/1986 | Evans et al. ............... 53/565 X |
| 4,901,218 | 2/1990 | Cornwell . |
| 4,912,623 | 3/1990 | Rantala et al. . |
| 4,921,092 | 5/1990 | Crawford et al. . |
| 4,924,657 | 5/1990 | Berti et al. ............... 53/75 X |
| 4,955,176 | 9/1990 | Seko et al. ............... 53/55 X |
| 4,964,258 | 10/1990 | Seko et al. ............... 53/75 |
| 5,082,103 | 1/1992 | Ross et al. . |
| 5,177,930 | 1/1993 | Harston et al. ............... 53/55 |
| 5,301,488 | 4/1994 | Ruhl et al. . |
| 5,337,411 | 8/1994 | Harrison, Jr. . |
| 5,485,712 | 1/1996 | Cherney et al. ............... 53/55 X |

*Primary Examiner*—Horace M. Culver
*Attorney, Agent, or Firm*—McAndrews, Held & Malloy, Ltd.; Michael A. Catania, Esq.

[57] ABSTRACT

A packaging machine under control of an electronic control system is set forth. The packaging machine includes a plurality of servo driven packaging stations that execute the processes required to fill and seal a carton. Each of the packaging stations is driven by one or more servomotors associated therewith. A plurality of servo amplifiers are connected to the servomotors to control the rotational movement of the servomotors thereby to effect control of the motion of the various components associated with each if the packaging stations. The packaging machine further includes at least two programmable devices connected for communication over a common bus. A programmable axis manager (PAM) is connected to control the plurality of servo amplifiers and, thus, the motion profiles of the servomotors and components of the respective processing station. A programmable logic controller (PLC) is connected to receive and transmit input/output signals associated with the plurality of packaging stations. The PAM and the PLC communicate data variable values over the common bus using predetermined fingerprints assigned to each variable value. Use of the fingerprint/variable value protocol allows high speed communication between the PLC and PAM thereby allowing the PLC and PAM to be viewed as a single control unit.

42 Claims, 32 Drawing Sheets

OVERVIEW

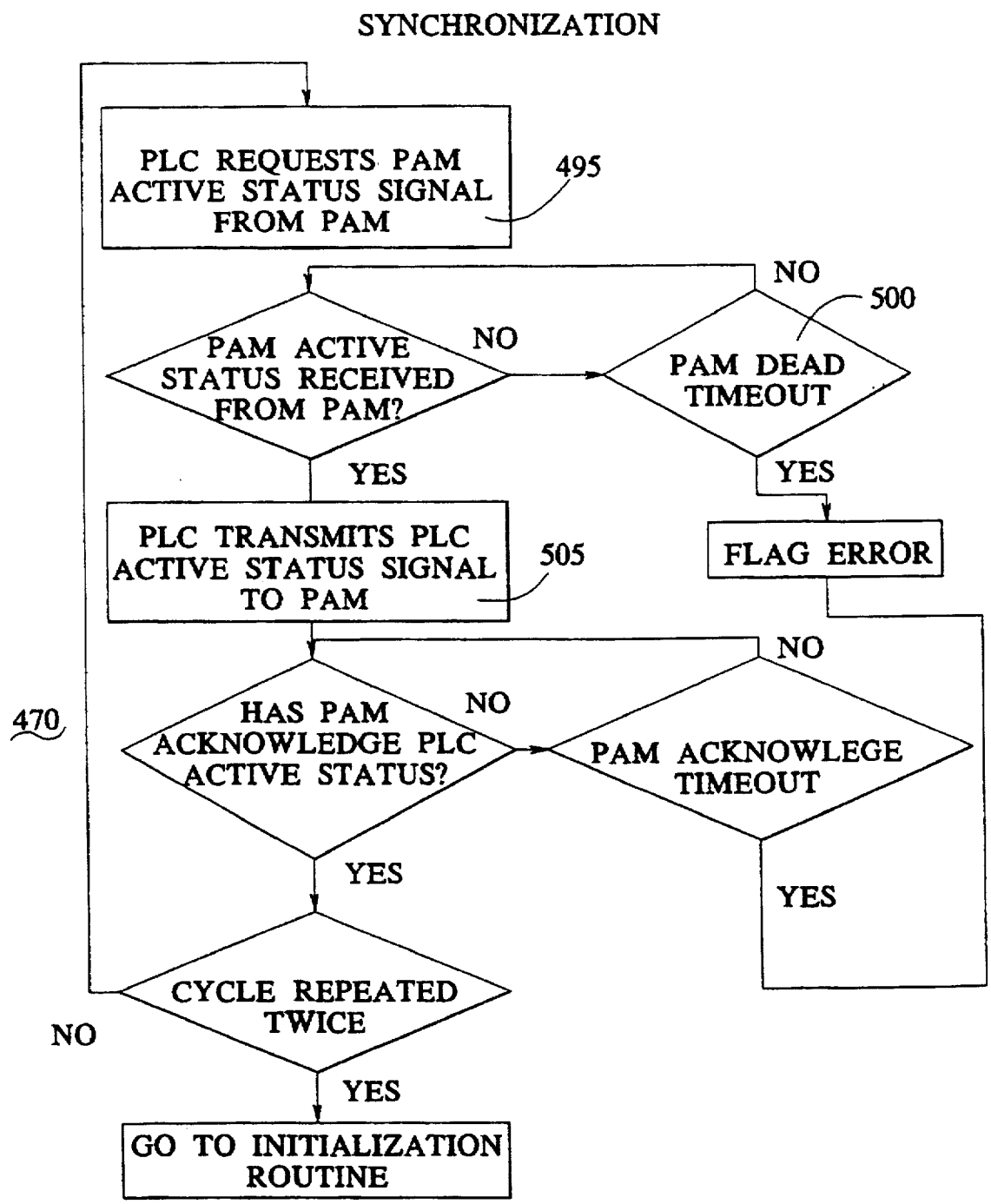

FIG. 8

INITIALIZATION

515: PLC SENDS CRCs TO PAM OF THE PAM VARIABLES THAT IT WANTS COMMUNICATED FROM THE PAM DURING RUNTIME

→ 520: PAM ASSIGNS FINGERPRINTS TO EACH OF THE CRCs THAT IDENTIFY EACH PAM VARIABLES THAT WAS COMMUNICATED BY THE PLC

→ 525: PAM TRANSMITS THE FINGERPRINTS FOR EACH OF THE PAM VARIABLES BACK TO THE PLC

→ 530: PLC STORES THE FINGERPRINT VALUES FOR EACH PAM VARIABLES FOR LATER USE DURING RUNTIME

→ 535: PAM SENDS CRCs TO PLC OF THE PLC VARIABLES THAT IT WANTS COMMUNICATED FROM THE PLC DURING RUNTIME

→ 540: PLC ASSIGNS FINGERPRINTS TO EACH OF THE CRCs THAT IDENTIFY EACH PLC VARIABLES THAT WAS COMMUNICATED BY THE PAM

→ 545: PLC TRANSMITS THE FINGERPRINTS FOR EACH OF THE PLC VARIABLES BACK TO THE PAM

→ 550: PAM STORES THE FINGERPRINT VALUES FOR EACH PLC VARIABLES FOR LATER USE DURING RUNTIME

→ 480: INITIALIZE VARIABLE VALUES AND PROCEED (475)

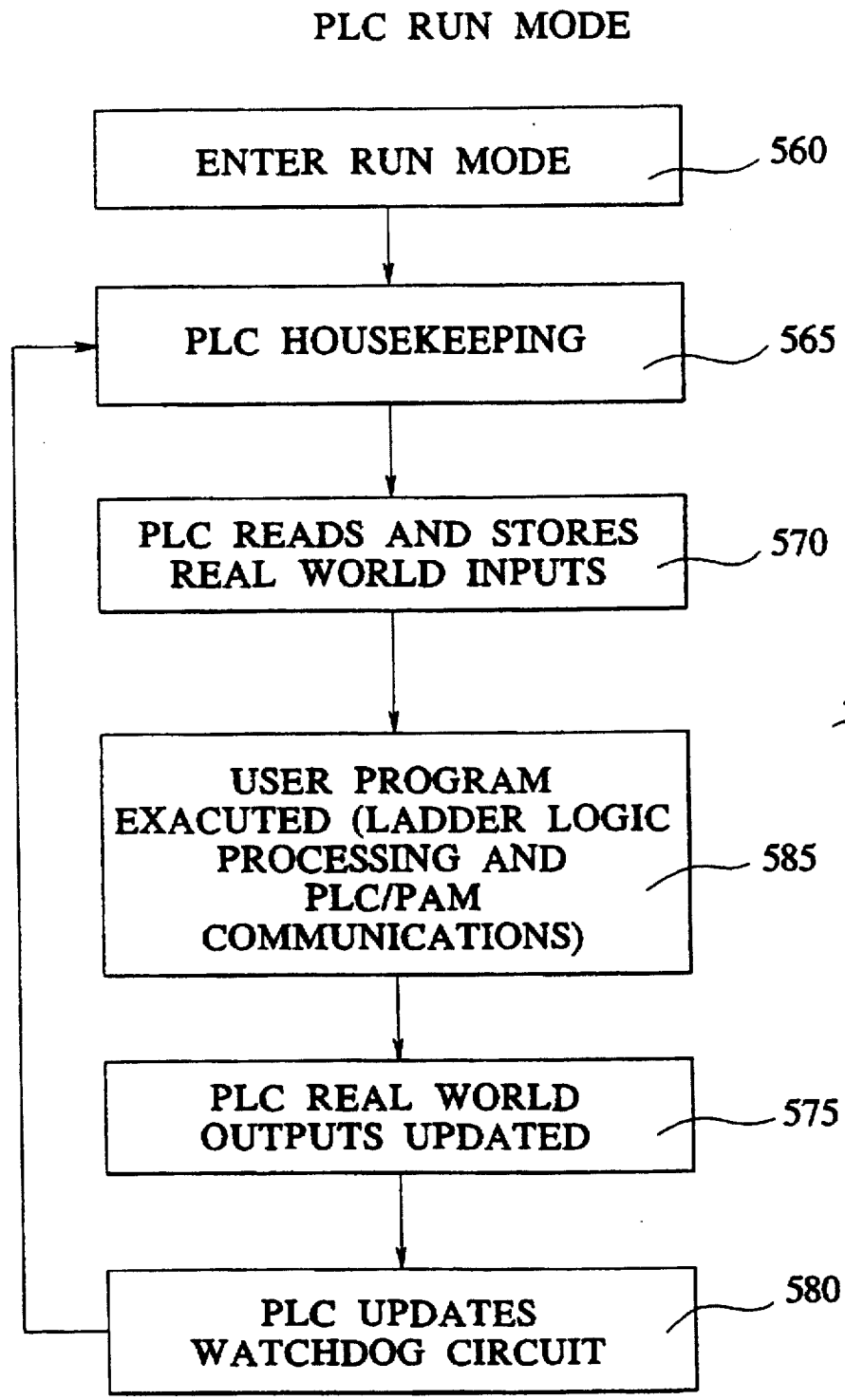

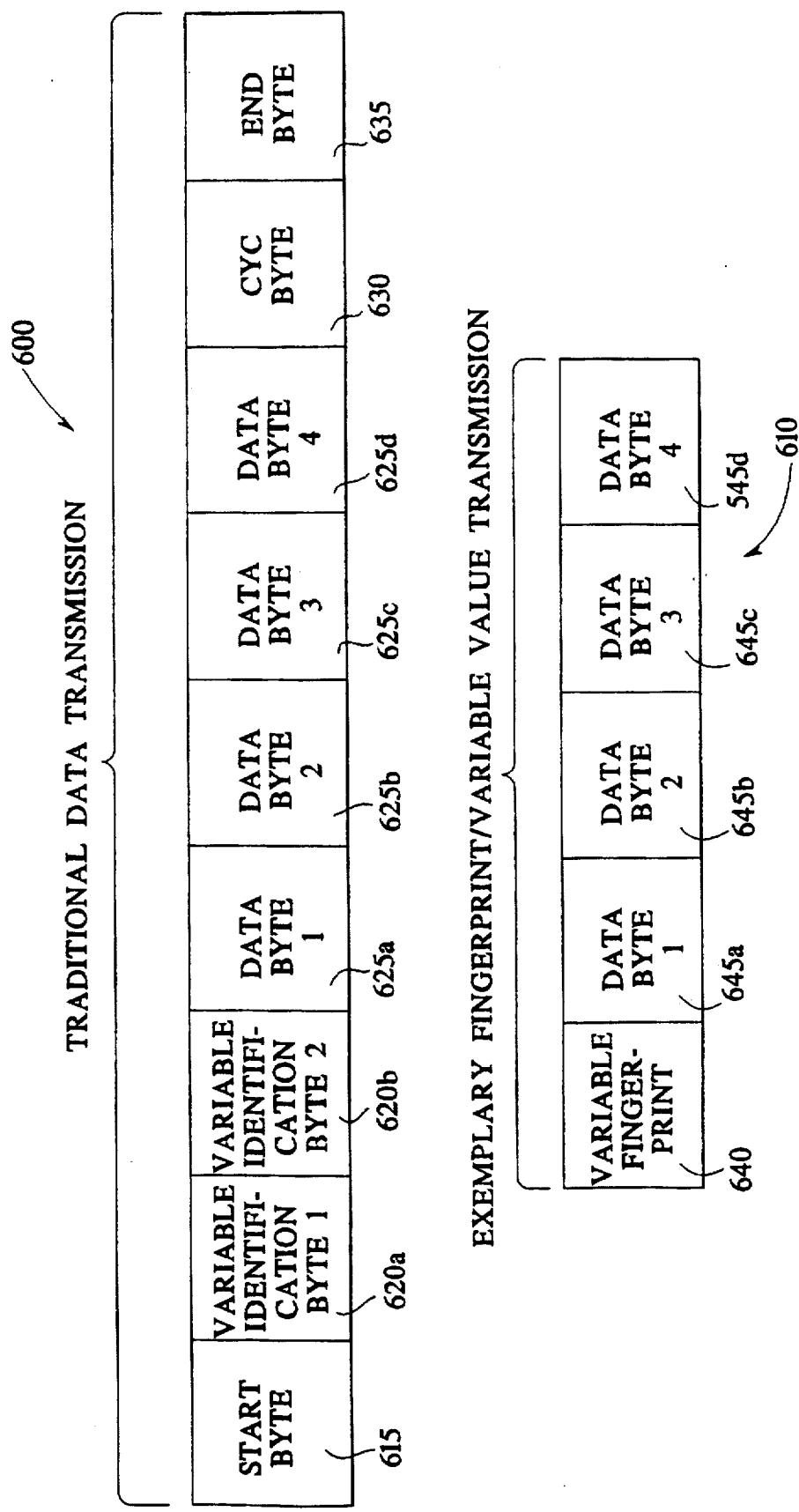

PLC/PAM VARIABLE COMMUNICATIONS

TOP PREFOLDER VELOCITY PROFILE

TOP PREFOLDER ACCELERATION PROFILE

BOTTOM SEALER CAM POSITION PROFILE

BOTTOM SEALER CAM VELOCITY PROFILE

FILL LIFT VELOCITY PROFILE

FILL LIFT ACCELERATION PROFILE

BOTTOM FORMER LIFT VELOCITY PROFILE

BOTTOM FORMER LIFT ACCELERATION PROFILE

CONTROL SYSTEM FOR A PACKAGING MACHINE

CROSS-REFERENCE TO RELATED APPLICATIONS

This application is a continuation-in-part of U.S. Ser. No. 08/190,546, filed Feb. 2, 1994 and now U.S. Pat. No. 5,488,812.

TECHNICAL FIELD

The present invention relates to a control system for a packaging machine. More specifically, the present invention relates to a control system that utilizes a programmable logic controller and a programmable axis manager that communicate through a high speed communication interface.

BACKGROUND

Packaging machines are known that integrate the various components necessary to fill and seal a container into a single machine unit. This packaging process, generally stated, includes feeding carton blanks into the machine, sealing the bottom of the cartons, filling the cartons with the desired contents, sealing the tops of the cartons, and then off loading the filled cartons for shipping. The motion and I/O control of the packaging machine may be undertaken by an electronic control system.

Traditionally, control systems for packaging machines have utilized programmable logic controllers (PLC) to effect both motion and I/O control. PLC system architecture, however, is principally directed to I/O control and has only limited value as an axis controller. Such a system is described in U.S. Pat. No. 5,177,930, issued Jan. 12, 1993. As illustrated in the '930 Patent, a single PLC is utilized to control both the motion and the I/O.

Trends within the field of packaging machines point toward increasingly high capacity machines intended for rapid, continuous filling and sealing of a very large number of identical or similar packaging containers, e.g., containers of the type intended for liquid contents such as milk, juice, and the like. One such machine is disclosed in U.S. Ser. No. 08/190,546, filed Feb. 2, 1994, and is now U.S. Pat. No. 5,488,812, which is hereby incorporated by reference. The machine disclosed in the '546 application includes a plurality of processing stations, each station implementing one or more processes to form, fill, and seal the containers. Each of the processing stations is driven by one or more servomotors that drive the various components of each of the processing stations.

The increased throughput and decreased size requirements have increased the demands that are placed on the control systems that are employed. As the number of axes increases, the demands on the speed of the control system response also increases. The traditional single PLC control system is often inadequate to meet these speed requirements. Accordingly, a more sophisticated control system for a packaging machine of the foregoing type is desirable.

SUMMARY OF THE INVENTION

A packaging machine under control of an electronic control system is set forth. The packaging machine includes a plurality of servo driven packaging stations that execute the processes required to fill and seal a carton. Each of the packaging stations is driven by one or more servomotors associated therewith. A plurality of servo amplifiers are connected to the servomotors to control the rotational movement of the servomotors thereby to effect control of the motion of the various components associated with each of the packaging stations. The packaging machine further includes at least two programmable devices connected for communication over a common bus. A programmable axis manager (PAM) is connected to control the plurality of servo amplifiers and, thus, the motion profiles of the servomotors and components of the respective processing station. A programmable logic controller (PLC) is connected to receive and transmit input/output signals associated with the plurality of packaging stations. The PAM and the PLC communicate data variable values over the common bus using predetermined fingerprints assigned to each variable value. Use of the fingerprint/variable value protocol facilitates high speed communication between the PLC and PAM thereby allowing the PLC and PAM to be viewed as a single control unit.

In accordance with one embodiment of the packaging machine, the PLC and PAM may communicate with one another by accessing a common set of memory locations that are, for example, disposed in dual port memory located in the PAM and which are accessible by the PLC over the communication bus. Selected memory locations within the common set of memory locations have predetermined functions, such as flagging a message from the PLC or PAM, identifying where fingerprint and variable data are stored for communication, and acknowledging receipt of the fingerprint and variable data.

In accordance with further aspects of the packaging machine, the PAM and the PLC may effect initialization through an initialization sequence that facilitates an efficient software development platform. Such initialization may be effected, for example, by exchanging selected CRC values between the PAM and PLC, the selected CRC values identifying which variables are to be used in communications between the PAM and PLC at runtime. The PLC and PAM may then assign the predetermined fingerprints corresponding to the selected CRC values and communicate the fingerprint values to one another. The predetermined fingerprints are subsequently used to identify each variable in subsequent communications between the PLC and PAM at runtime. Such variables may include variables that allow the PLC to instruct the PAM to execute a production cycle, to instruct certain mechanisms to go to a predetermined position, etc. Such variables may further include variables that allow the PAM to inform the PLC of the presence of power at the various processing stations and, further, inform the PLC of excessive torque requirements from the servomotors indicative of system errors.

BRIEF DESCRIPTION OF THE DRAWINGS

FIG. 7 illustrates one embodiment of the synchronization task of FIG. 6.

FIG. 8 illustrates one embodiment for the initialization task of FIG. 6.

FIG. 9 is a flow diagram illustrating operation of the PLC in its run mode.

FIG. 10 is a block diagram illustrating a traditional data transmission and an exemplary fingerprint/variable value transmission.

DETAILED DESCRIPTION OF THE PREFERRED EMBODIMENT

Figure 1:
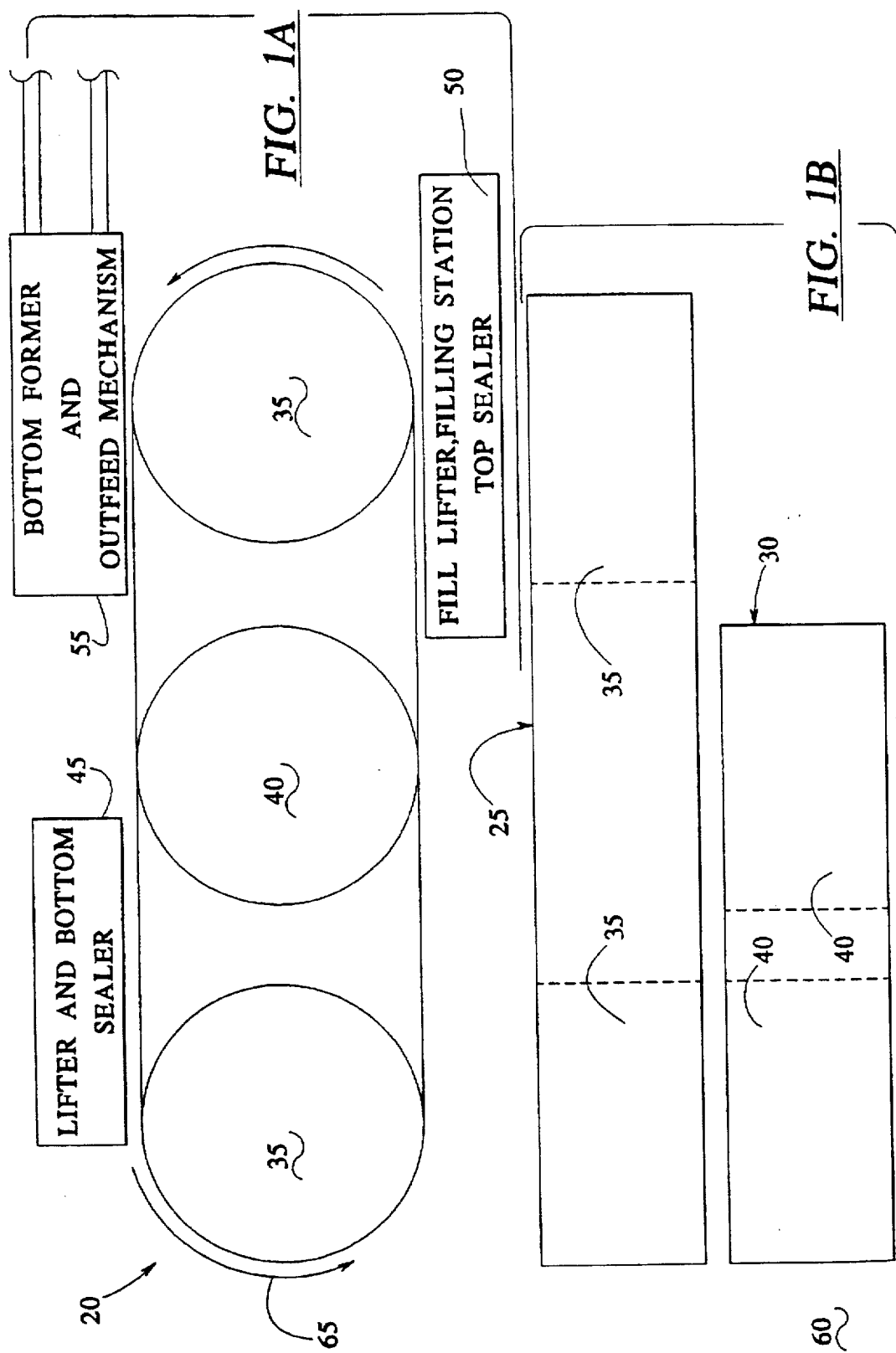
FIGS. 1A and 1B are schematic illustrations of a packaging machine including a plurality of processing stations that each include one or more servo driven mechanisms.

FIGS. 1A and 1B are schematic illustrations of a packaging machine system such as the one disclosed in the aforementioned '546 application. The packaging system, shown generally at 20, includes an upper endless belt conveyor 25 and a lower endless belt conveyor 30. The upper endless belt conveyor 25 is driven by a pair of pulley wheels 35 that, for example, are driven by one or more servomotors. The lower endless belt conveyor 30 is also driven by a pair of pulleys 40 that, for example, may be servomotor driven. The conveyors may be constructed in accordance with the teachings of U.S. Ser. No. 08/282,981, filed Jul. 29, 1994, (now U.S. Pat. No. 5,460,262) incorporated herein by reference.

A plurality of processing stations 45, 50, and 55 are disposed about the periphery of the endless belt conveyors 25 and 30. The processing stations 45, 50, and 55 each have their respective mechanical components driven by one or more servomotors that control the motion profile of the station components.

The lower conveyor 30 may receive erected carton blanks at end 60 and transport the carton blanks to processing station 45. Processing station 45 may include a lifter mechanism and a bottom sealer mechanism. The lifter mechanism may be constructed in accordance with the teachings of U.S. Ser. No. 08/315,410 (now U.S. Pat. No. 5,599,268) entitled "Belt Driven Linear Transport Apparatus for a Packaging Machine", and U.S. Ser. No. 08/315,401 (now U.S. Pat. No. 5,517,801) entitled "Lifter Mechanism Employing a Carton Gripper and Carton Bottom Seal Configuration for Same", both of which are filed on even date herewith. The bottom sealer mechanism may be constructed in accordance with the teachings of U.S. Ser. No. 08/315,412 (now U.S. Pat. No. 5,605,026), entitled "Ultrasonic Carton Sealer", which is likewise filed on even date herewith. Both the lifter mechanism and the bottom sealer mechanism are driven by respective servomotors.

In operation, the lifter mechanism transports the erected cartons in groups from the lower conveyor 30 to the upper conveyor 25. At the upper conveyor 25, the bottoms of the cartons are sealed, for example, with previously noted sealing apparatus using ultrasonic energy.

The upper conveyor 25 transports the cartons in the direction indicated by arrow 65 to processing station 50. Processing station 50 may include a fill lifter mechanism, a plurality of filling nozzles respectively associated with each of the cartons, and a top sealer. The fill lifter may be constructed in accordance with the teachings of the aforementioned U.S. Ser. No. 08/315,410 application (now U.S. Pat. No. 5,599,268) and 08/315,401 application (now U.S. Pat. No. 5,517,801) while the top sealer may be constructed in accordance with the teachings of the aforementioned U.S. Ser. No. 08/315,412 application (now U.S. Pat. No. 5,605,026). At processing station 50, the fill lifter lifts the cartons to a position proximate the fill nozzles and gradually lowers the cartons as product is dispensed into them. Once the cartons have been filled, the top sealer seals the carton into the familiar gabled top configuration.

Figure 2:
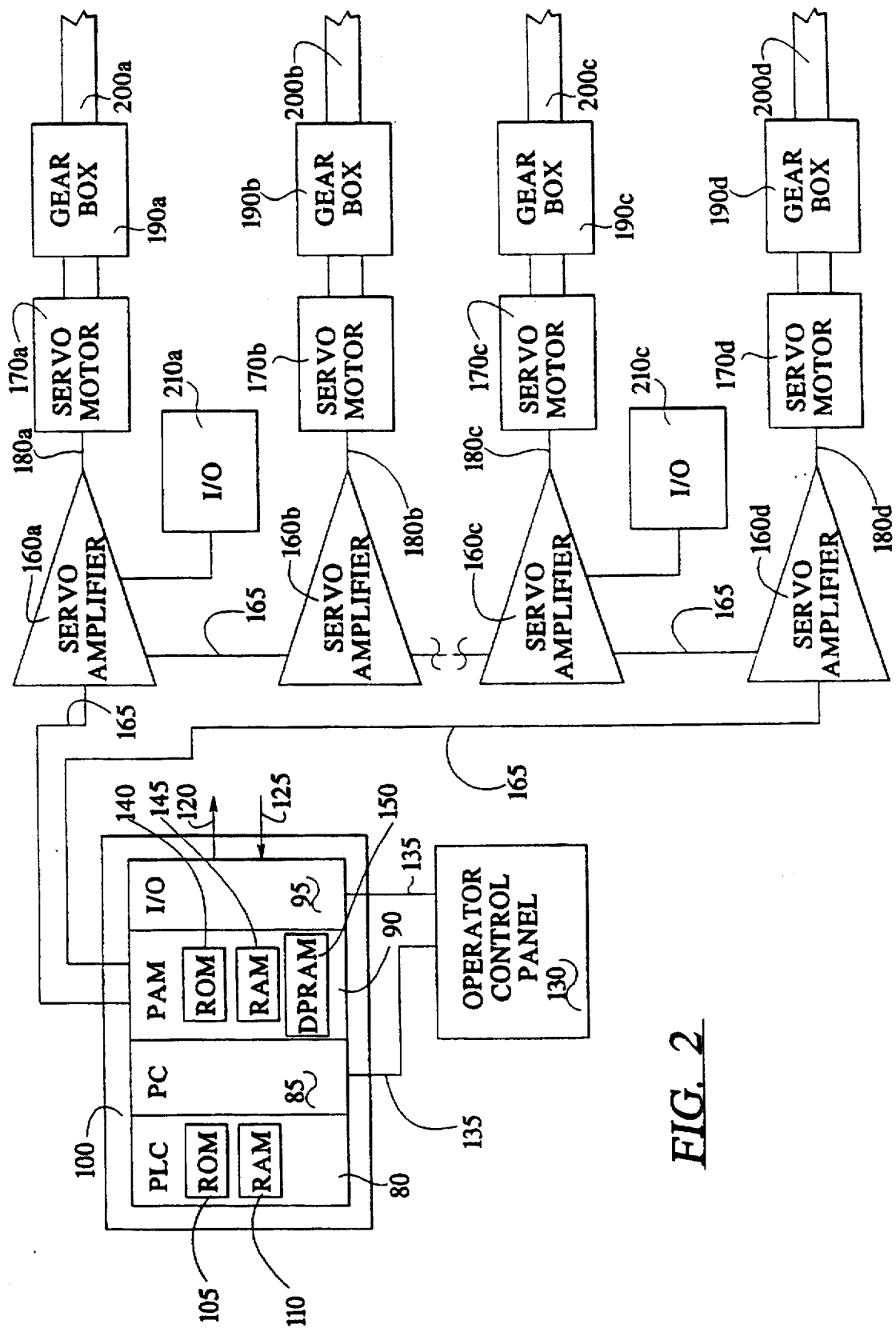
FIG. 2 is a schematic block diagram illustrating one embodiment of the control system for controlling the operation of the packaging machine illustrated in FIGS. 1A and 1B.

After the tops of the cartons have been sealed, the upper conveyor 25 transports the cartons in the direction of arrow 70 to processing station 55. Processing station 55 may include a bottom forming mechanism and an outfeed mechanism. The bottom forming mechanism, for example, may be constructed in accordance with the teachings of U.S. Ser. No. 08/315,403 (now U.S. Pat. No. 5,551,211) entitled "Vacuum Operated Bottom Former", filed on even date herewith, and the outfeed mechanism may be constructed in accordance with the teachings of either U.S. Ser. No. 08/315, 409 (now U.S. Pat. No. 5,549,191) entitled "Apparatus for Transferring Containers to a Moving Conveyor") or U.S. Ser. No. 08/315,404 (now U.S. Pat. No. 5,560,471), likewise entitled "Apparatus for Transferring Containers to a Moving Conveyor", both of which are filed on even date herewith. At processing station 55, the bottom forming mechanism forms the bottom of the cartons to allow them to sit properly in an erect state. After the bottoms have been formed, the outfeed mechanism transfers the cartons to a distribution system, shown here as a dual line conveyor 75. FIG. 2 is a schematic block diagram illustrating one embodiment of a control system for controlling the operation of the packaging machine illustrated in FIG. 1. The control system includes a PLC 80, an industrial PC 85, a PAM 90, and an I/O interface unit 95, all of which are disposed in a bus rack 100 for communication with one another. The bus rack 100, may be a VME bus, a SIMATIC S5 bus, or any other bus that is capable of supporting multiple processors.

As illustrated, the PLC 80 includes a ROM 105 and a RAM 110. The ROM 105 includes the software that is required to program and run the PLC 80 and, for example, may include $E^2$ PROM for storing the ladder logic programming and, as will be described in detail below, the PLC communication program. The PLC 80 is in communication with the I/O interface unit 95 which receives and sends I/O sensor and control signals along lines 120 and 125. Additionally, the I/O interface unit 95 receives signals, such as keypresses, from an operator control panel 130 along one or more lines 135. The industrial PC 85 is also connected for communication with the operator control panel 130 which, for example, can send detailed graphic information to a display on the operator control panel 130 that advises the machine operator of the status of the machine.

The PAM 90 includes a ROM 140 and a RAM 145. The ROM 140 includes the programs necessary to operate and program the PAM 90 and, for example, may include E² PROM for storing the user program. The PAM 90 further includes a dual port memory, shown here as DPRAM 150. The PLC 80 and PAM 90 may both access the memory locations in the DPRAM 150, the PLC 80 accessing the DPRAM 15 along the VME bus.

The PAM 90 is connected for communication with a plurality of servo amplifiers 160 along one or more lines 165 which may constitute an optical ring network. The servo amplifiers 160, in turn, are each connected for control of a respective servomotor 170 along lines 180. The servomotors 170, in turn, are connected to drive, for example, gear shafts 190, either directly or through a respective gear box. The drive shafts 200, for example, each constitute one or more components of one of the processing stations 45, 50, and 55.

By way of example, the servo amplifiers 160 may each be a Model ST-1 servomotor and the PAM 90 may be a programmable axes manager, both of which are manufactured and available from Socapel. Similarly, by way of example, the PLC 80 may be a Model 9070 programmable logic controller that is available from GE Fanuc.

In the case where one or more Model ST-1s are used to implement the system, the servomotors 170 may be used to sense and propagate I/O signals through, for example, I/O interface circuits 210. The status of sensor inputs as well as the control of actuating outputs to and from the I/O circuit 210 are communicated along the optical ring network.

Figure 3:
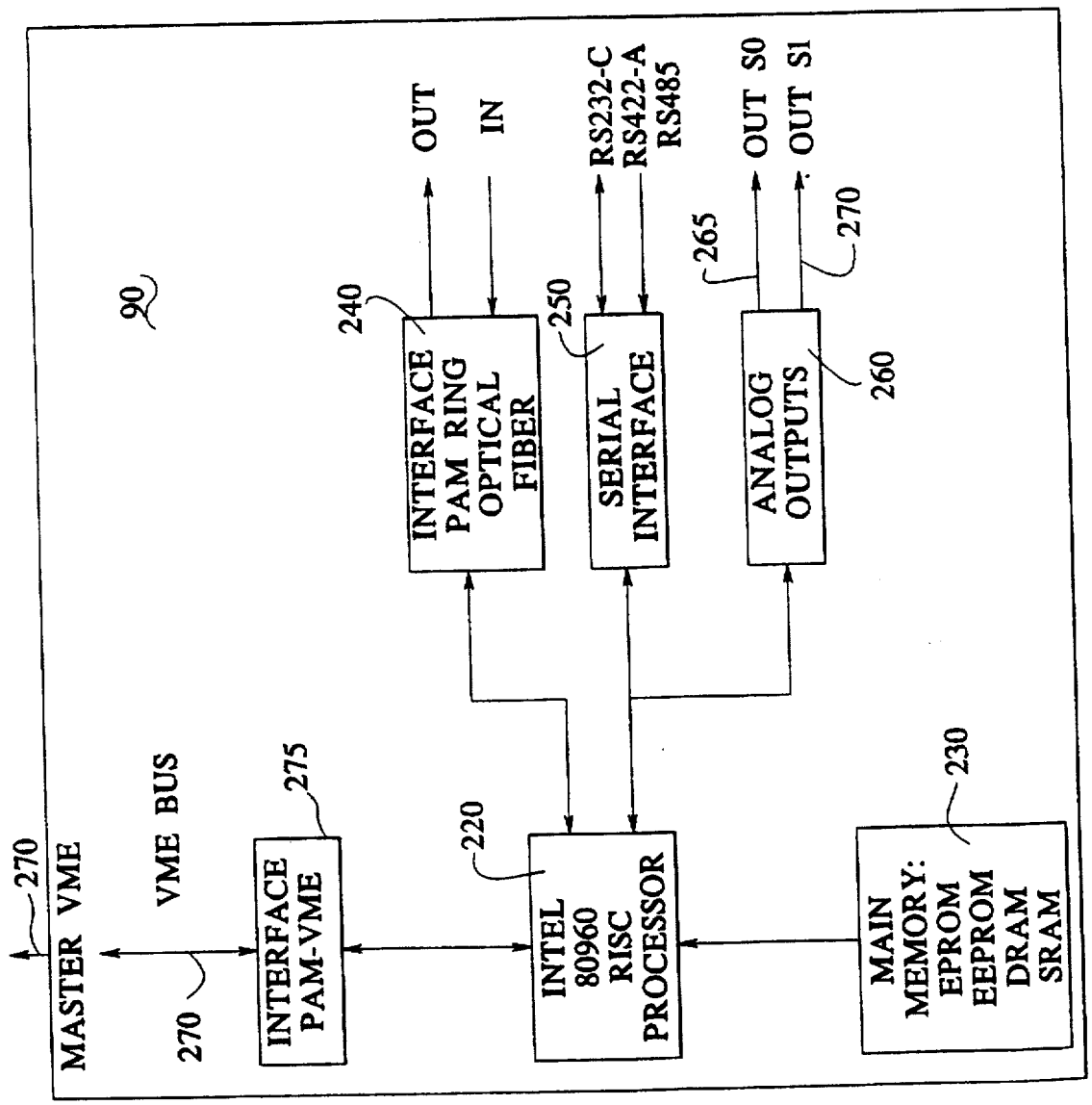
FIGS. 3 and 4 are schematic block diagrams of a programmable axis manager including a VME bus interface.

A schematic block diagram of one embodiment of a PAM 90 is set forth in FIG. 3. Central to the operation of the PAM 90, is a central processor 220 that, for example, may be an INTEL 80960 RISC processor. Programs and data for use by the central processor 220 are stored in a main memory 230. The main memory 230, as illustrated, may include EPROM, E² PROM, DRAM, and/or SRAM memory.

The central processor 230 is in communication with several different interface circuits. An optical ring interface circuit 240 is used to allow the central processor 220 to communicate with the servo amplifiers 160 over the optical ring network lines 165. A serial interface circuit 250 may be provided to allow connection between the PAM 90 and a terminal or a computer for application diagnosis and debugging. A D/A convertor circuit 260 provides analog signals at lines 265 and 270 that may be used for monitoring or debugging purposes.

Figure 4:
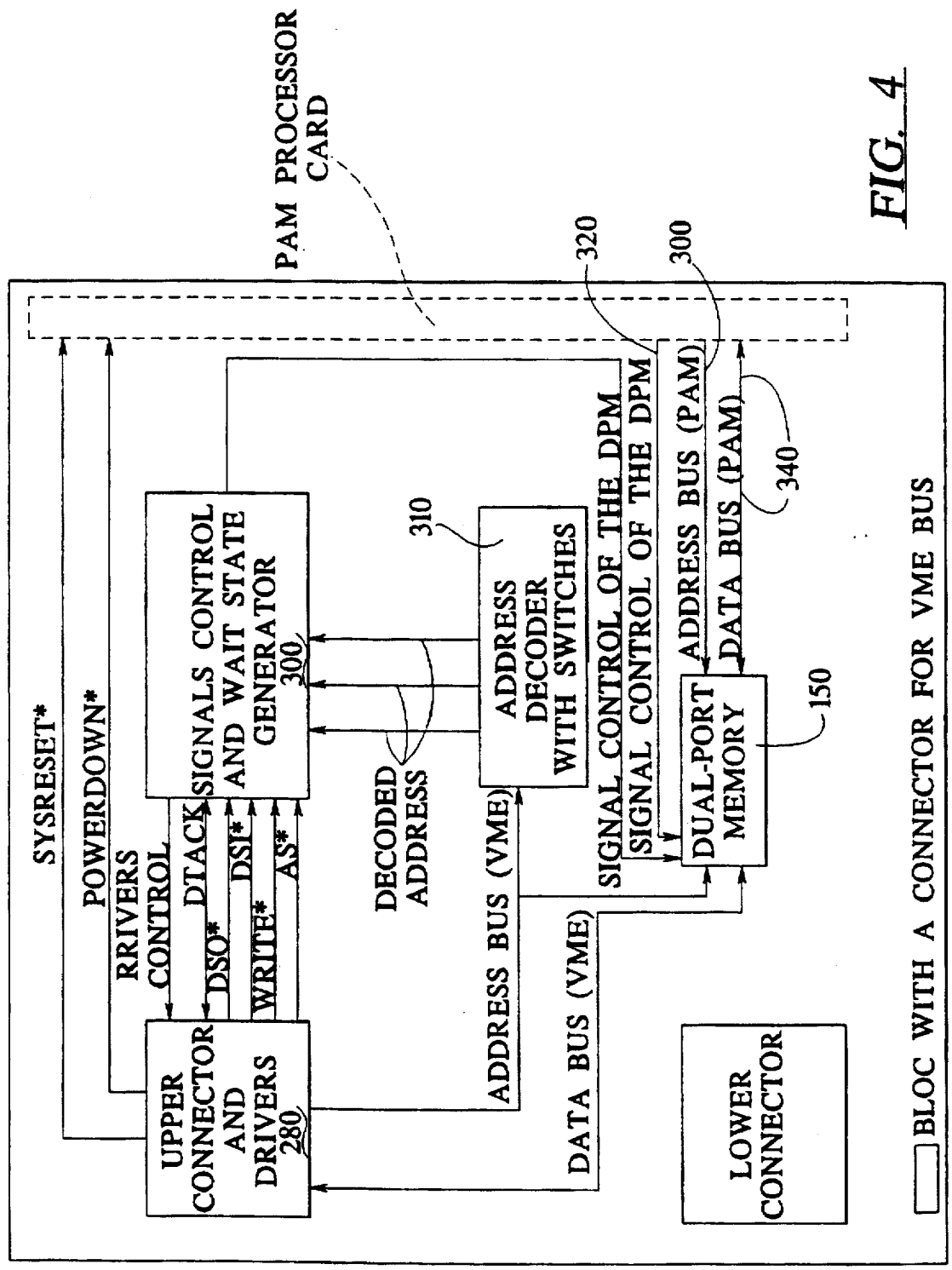

The central processor 220 connects to VME bus 270 using a PAM/VME interface circuit 275, the details of which are shown in schematic form in FIG. 4. A connector block 280 includes the connectors and drivers that are directly connected to VME bus rack 100. The interface further includes a signal control and wait state generator 300, an address decoder 310, and the dual-port memory 150.

The PAM 90 functions as a slave device on the VME bus 270. As such, the PAM 90 does not have direct access to the bus 270. Rather, all communication between the PAM 90 and the PLC 80 takes place through the dual-port memory 150 which is accessible by both the PAM 90 and the PLC 80. Access to the dual-port memory 150 over the VME bus 270 is controlled with the assistance of the signal control and wait state generator 300 and address decoder 310. Access by the central processor 220 to the dual-port memory 150 is controlled by the signals on the signal control lines 320, the address lines 330, and the data lines 340.

Figure 5:
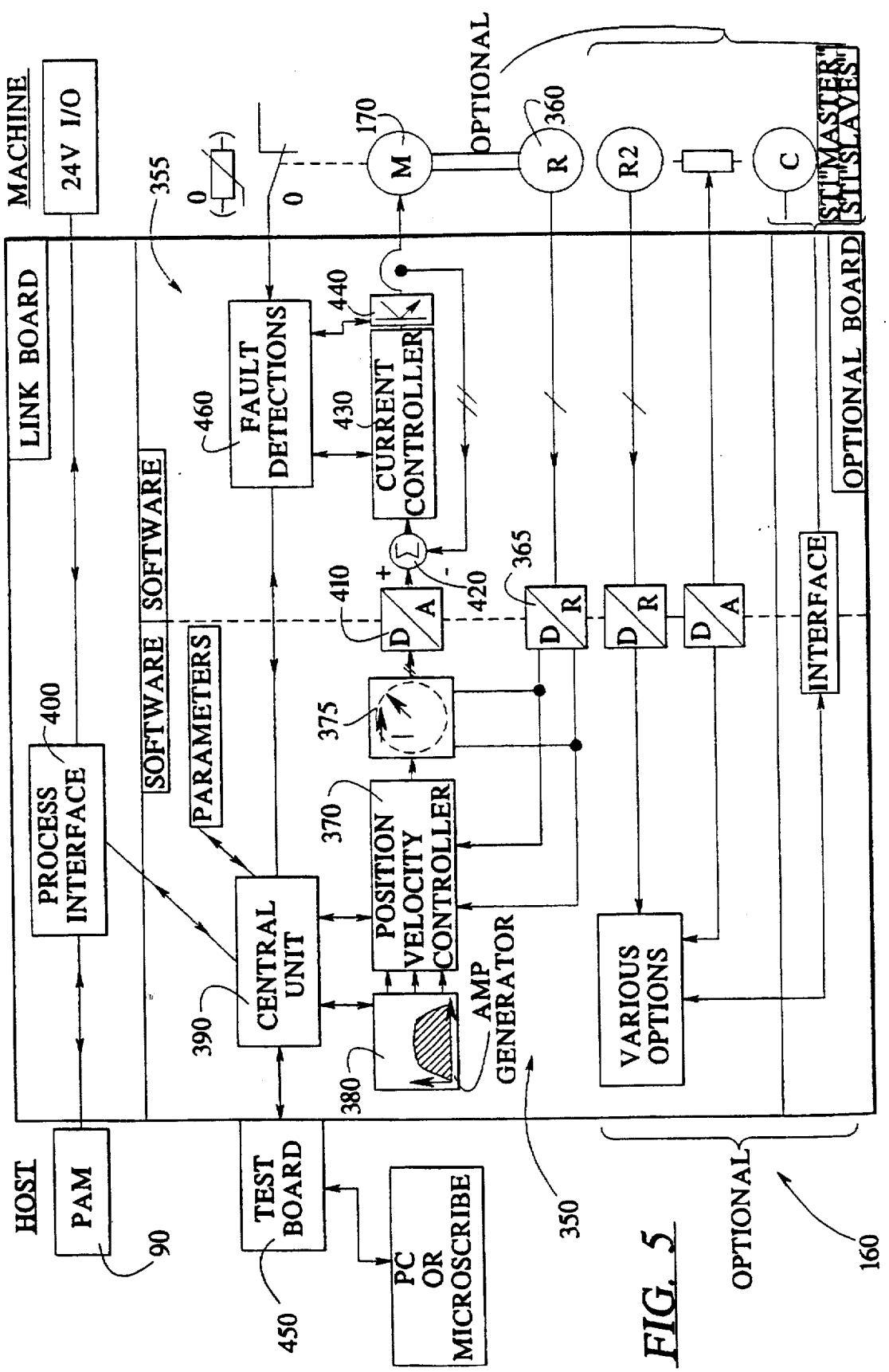
FIG. 5 is a schematic block diagram of one embodiment of the servo amplifier that may be used in the control system of FIG. 2.

FIG. 5 is schematic block diagram of one embodiment of a servo amplifier 160 that may be used with the PAM described above. In the illustrated block diagram, the servo amplifier, has been functionally divided into software functions shown on side 350 and hardware functions shown on side 355. On the hardware side 355, the position and speed of the servomotor 160 is obtained by monitoring signals sent from a resolver 360 disposed on the shaft of the servomotor 170. These signals are supplied to a resolver hardware/software interface 365 that converts the signals into position and angular speed measurements. These measurements are sent to position/velocity controller 370 and a phase controller 375 software. The position/velocity controller 370 interfaces with ramp generating software 380 and central unit software 390. The central unit software 390 receives motion profile information from the PAM 90 through a process interface 400. The central unit software 390, in turn, sends the requisite motion profile data to the ramp generating software 380 and the position/velocity controller software 370. This data is ultimately sent as digital signals to a D/A convertor 410. The output of the D/A convertor 410 is supplied through a summing circuit 420 to a current controller 430 that, in turn, drives an inverter array 440 that supplies the necessary power signals to move the servomotor 170 to the desired position in accordance with the programmed motion profile. The central unit software 390 may also interface with a test board 450 that provides the necessary connections for a personal computer thereby allowing debugging and monitoring of the servomoamplifier 160. Faults are detected by a fault detection circuit 460 and communicated to the PAM 90 through the central unit software 390 and the process interface 400. Such faults may then be communicated to the PLC 80 over the VME bus 270, for example, in the manner described below.

Figure 6:
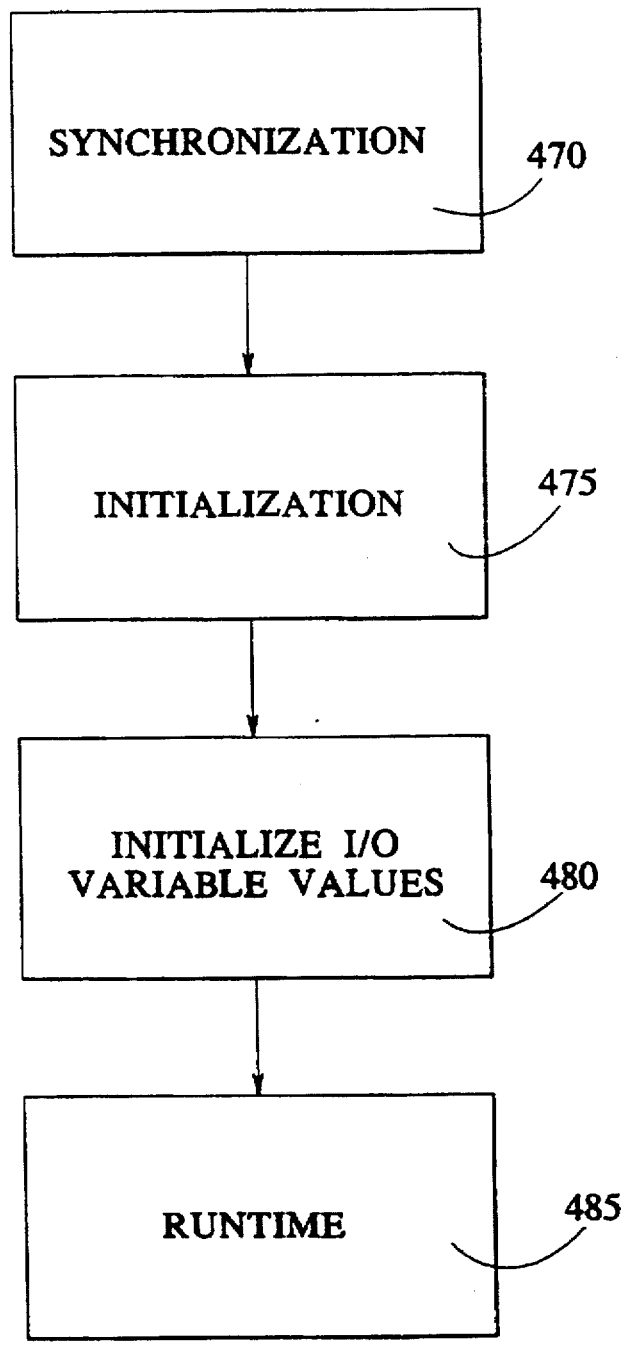
FIG. 6 is a flow diagram illustrating the execution of a plurality of tasks by the hardware and software of the PLC and PAM.

The hardware and software of the PLC 80 and the PAM 90 execute a plurality of tasks, illustrated here in FIG. 6. In accordance with this embodiment, the PLC 80 and PAM 90 first execute a synchronization task 470. During synchronization, the PLC 80 and PAM 90 advise one another that they are active (i.e., that they each have power supplied and have completed their own internal initial checks). After synchronization, an initialization task 475 is executed in which the PLC 80 and PAM 90 exchange cyclical redundancy check values (CRC) and fingerprint values for the data variables that will be communicated between them at runtime. Once the CRC and fingerprint values have been exchanged, the fingerprint values are used to exchange initial values for the variables that will be communication between the PAM 90 and PLC 80 at runtime. This task is illustrated at block 480. After the communication fingerprint and initial variable data values have been established and exchanged, the PLC 80 enters a run mode 485 during which, for example, it executes its ladder logic processing and PLC/PAM communications program, the PAM 90 executing tasks under the direction of the PLC 80.

FIG. 7 illustrates one manner in which synchronization between the PLC 80 and PAM 80 may be executed. As illustrated, the PLC 80 first requests an active status signal from the PAM 90 at 495. The PLC 80 then waits a predetermined period of time for receipt of the active status signal. If the active status signal is not received within the predetermined period of time, the synchronization program flags an error to the main PLC program at 500 thereby preventing further operation of the system. If the PLC 80 receives the active status signal from the PAM within the predetermined period of time, the PLC 80 transmits its own active status signal to the PAM 90 which must be acknowledged by the PAM at 505 within a predetermined period of time. If the PAM 90 fails to acknowledge receipt of the PLC's active status signal, the synchronization program will flag an error to the system's software at 500. If the PAM 90 acknowledges receipt of the PLC active status signal within the predetermined period of time, the cycle is again repeated.

Upon completion of the synchronization task 470, the initialization task 475, shown here in FIG. 8, is executed. During initialization, the PLC 80 first sends CRC values to the PAM 90 of the PAM variables that it wants communicated from the PAM 90 during runtime. This is shown at block 515. The PAM 90 receives the CRC values and compares them at 520 to a software table in the PAM's memory and, based on that comparison, assigns fingerprint values to each of the CRC values that were transmitted by the PLC 80. The PAM 90 then transmits the fingerprint values for each of the PAM variables back to the PLC 80 at 525. The PLC 80 stores these fingerprint values at 530 for later use during subsequent communication between the PLC and PAM at runtime.

After the PLC 80 has identified the PAM variables that it desires to use during runtime and has received the corresponding fingerprint values, the PAM 90 sends CRC values to the PLC 80 at 535 of the PLC variables that it wants communicated from the PLC 80 during runtime. The PLC 80 compares these CRC values to a table stored in its memory and assigns a fingerprint value to each CRC value that it received as shown at 540. The PLC 80 then transmits the fingerprint values corresponding to each of the CRC values received from the PAM back to the PAM 90 at 545. The PAM stores the fingerprint values for each PLC variable for later use during PLC/PAM communications at runtime as shown at 550. After the CRC values have been exchange and the corresponding fingerprint values have been assigned, the PLC 80 and PAM 90 exchange initial values for each of the variables that have been assigned a fingerprint.

FIG. 9 illustrates PLC operation at runtime when it is placed in the run mode. In the run mode, the PLC 80 executes several non-user defined tasks 560, 565, 570 and 580, which are part of the PLC's architecture, as well as a user program, designated here at block 585. After entering run mode at 560, the PLC 80 executes a series of housekeeping tasks at 565. The PLC 80 then reads and stores the real world inputs that are detected at the input ports of the PLC 80. Once the real world inputs have been stored, the PLC 80 executes the user program at 585 which, for example, includes ladder logic processing and PLC/PAM communications. After completing its tasks, the user program returns control to the non-user defined task at 575 which updates the PLC real world outputs based on data received from the ladder logic processing of the user program at 585. A watchdog circuit is then updated at 580. A failure to update the watchdog circuit within a predetermined period of time will reset the PLC 80 and/or trigger an error signal that may be used to shut down the packaging machine.

FIG. 10 illustrates a comparison between a traditional data transmission, shown here at 600, and the transmission of variable data as implemented in the presently disclosed system shown here at 610. In accordance with traditional data transmissions, the data packet includes a start byte 615 variable, identification bytes 620, data bytes 625, a CRC byte 635, and an end byte 635. The CRC byte is, for example, a check sum of the variable identification bytes 620 and data bytes 625. The CRC byte 630 is calculated by the transmitting station immediately before the transmitting station sends the data transmission to a receiving station. The receiving station calculates its own CRC value and compares it to the CRC byte 630 that it received from the transmitting station to determine whether there have been any transmission errors. Such continuous calculation and re-calculation of the CRC byte 630, as well as the use of a start byte 615 and end byte 635, may waste valuable system time and resources. Such waste may not be tolerable in a PLC/PAM system that controls a high speed packaging machine that includes a substantial number of motion axes.

In contrast with the illustrated traditional data transmission 600, the exchange of variable data between the PLC 80 and PAM 90 of the present system ensues via a predetermined variable fingerprint 640 which is followed by the variable value that is transmitted in one or more (usually one) data bytes 654. This protocol facilitates high speed communication between the PLC 80 and the PAM 90 since it involves fewer transmitted bytes and, further, does not require continuous calculation and re-calculation of the CRC byte 630. Instead, the variable fingerprint of each variable that is to be communicated between the PLC 80 and the PAM 90 has been predetermined prior to runtime, for example, in the initialization task 475.

Figure 11:
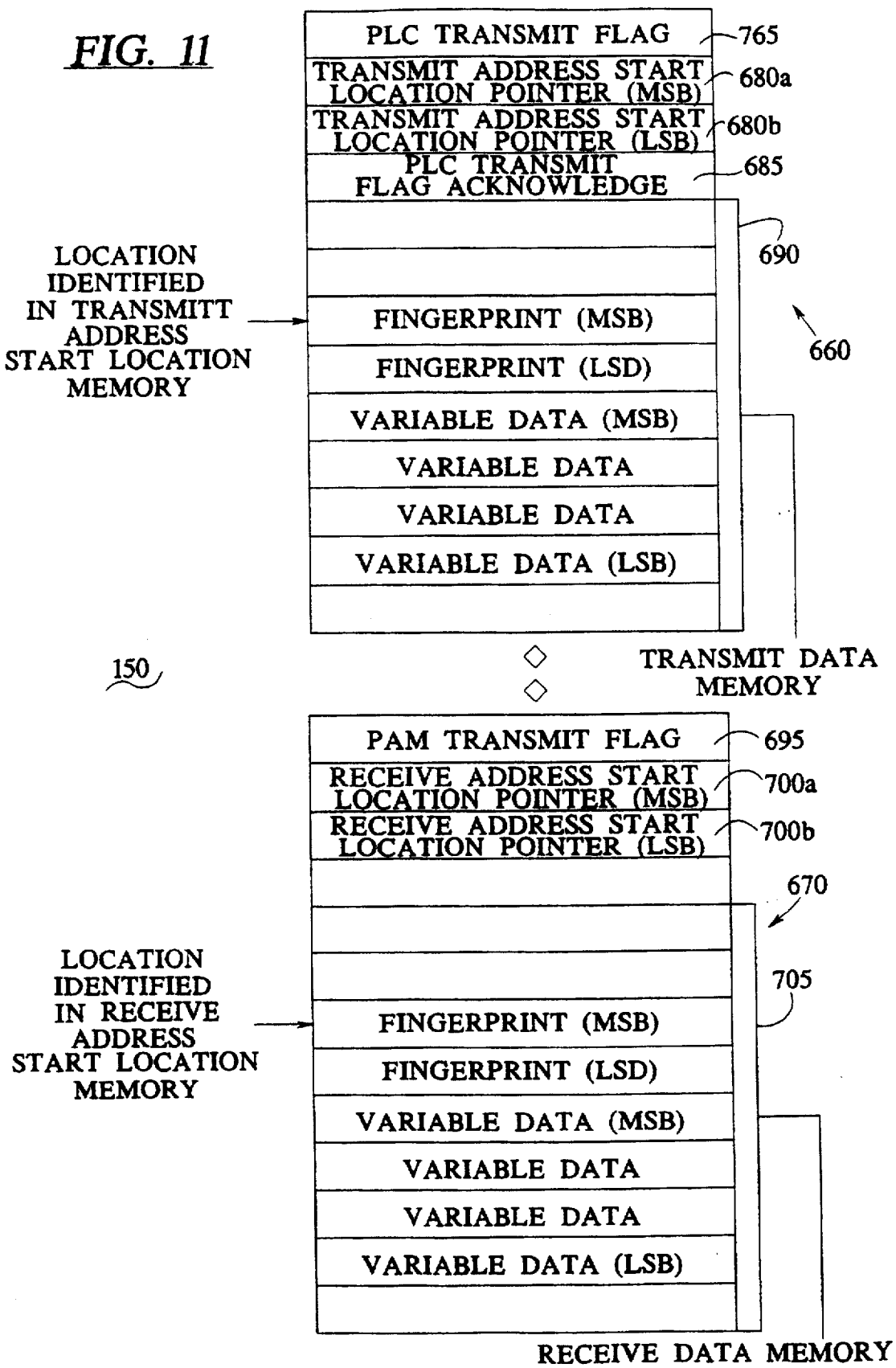
FIG. 11 illustrates one method of organizing the memory locations of the dual-port memory of the PAM.

As previously noted, data transmission between the PAM 90 and the PLC 80 takes place through the dual-port memory 150. FIG. 11 illustrates one method of organizing the memory locations of the dual-port memory 150.

In accordance with the illustrated memory organization, the dual-port memory 150 includes a transmit memory area, shown generally at 660 and a receive memory area, shown generally at 670. The transmit memory area 660 includes a PLC transmit flag 675, a transmit address start location pointer 680, a PLC transmit flag acknowledges a location 685, and transmit data memory 690. Similarly, the receive memory area 670 includes a PAM transmit flag 695, a receive address start location pointer 700, and receive data memory 705.

Figure 12:
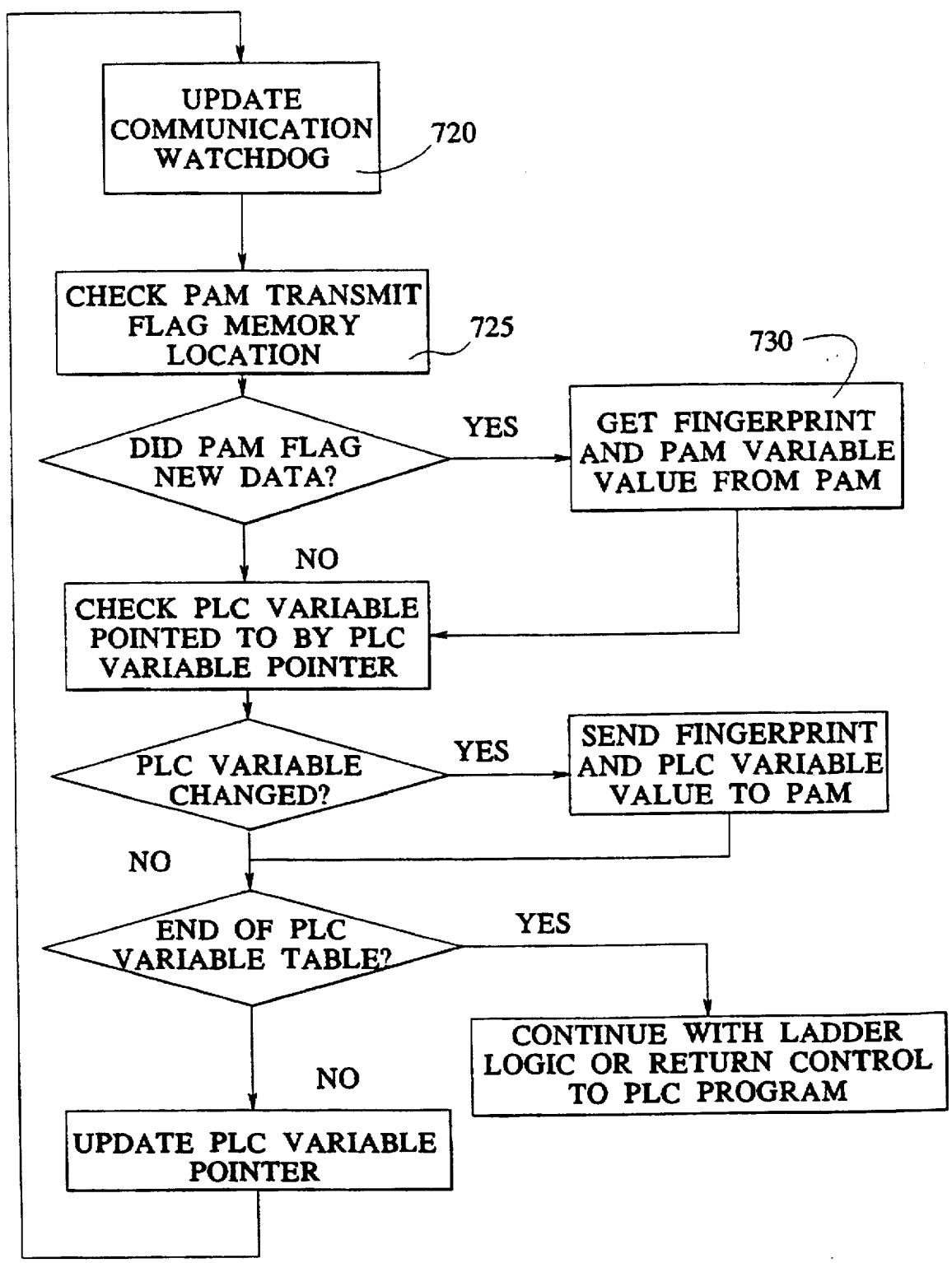
FIG. 12 is a flow diagram illustrating one embodiment of the PLC/PAM variable communications.

FIG. 12 is a functional flow diagram of one method of implementing the PLC/PAM variable communications. The variable communications task includes a periodic update of a communications watchdog at 720. If this watchdog is allowed to time-out, the variable communications program will flag a system error that may be used to shut down the packaging machine. After updating the communications watchdog, the PLC 80 checks the PAM transmit flag 695 in the receive memory area 660 of the PAM 90 at block 725 to determine whether the PAM has new data to transmit to the PLC 80. If the PAM transmit flag 695 is set, the fingerprint and PAM variable value are transferred from the PAM 90 to the PLC 80 as shown at 730.

After this transfer has occurred, the PLC 80 checks the PLC variable that is pointed to by a PLC variable pointer. If the PLC variable that is pointed to has changed, the fingerprint and the changed PLC variable value are sent to the PAM 90. A check is then made of the PLC variable pointer to determine whether the end of the PLC variable table has been reached. If the end of the table has been reached, the PLC/PAM variable communications are terminated and the PLC ladder logic program is allowed to continued, or control of the PLC processor is returned to the PLC non-user program. If the end of the table has not been reached, the PLC variable pointer is updated and the variable communications cycle is again executed.

Figure 13:
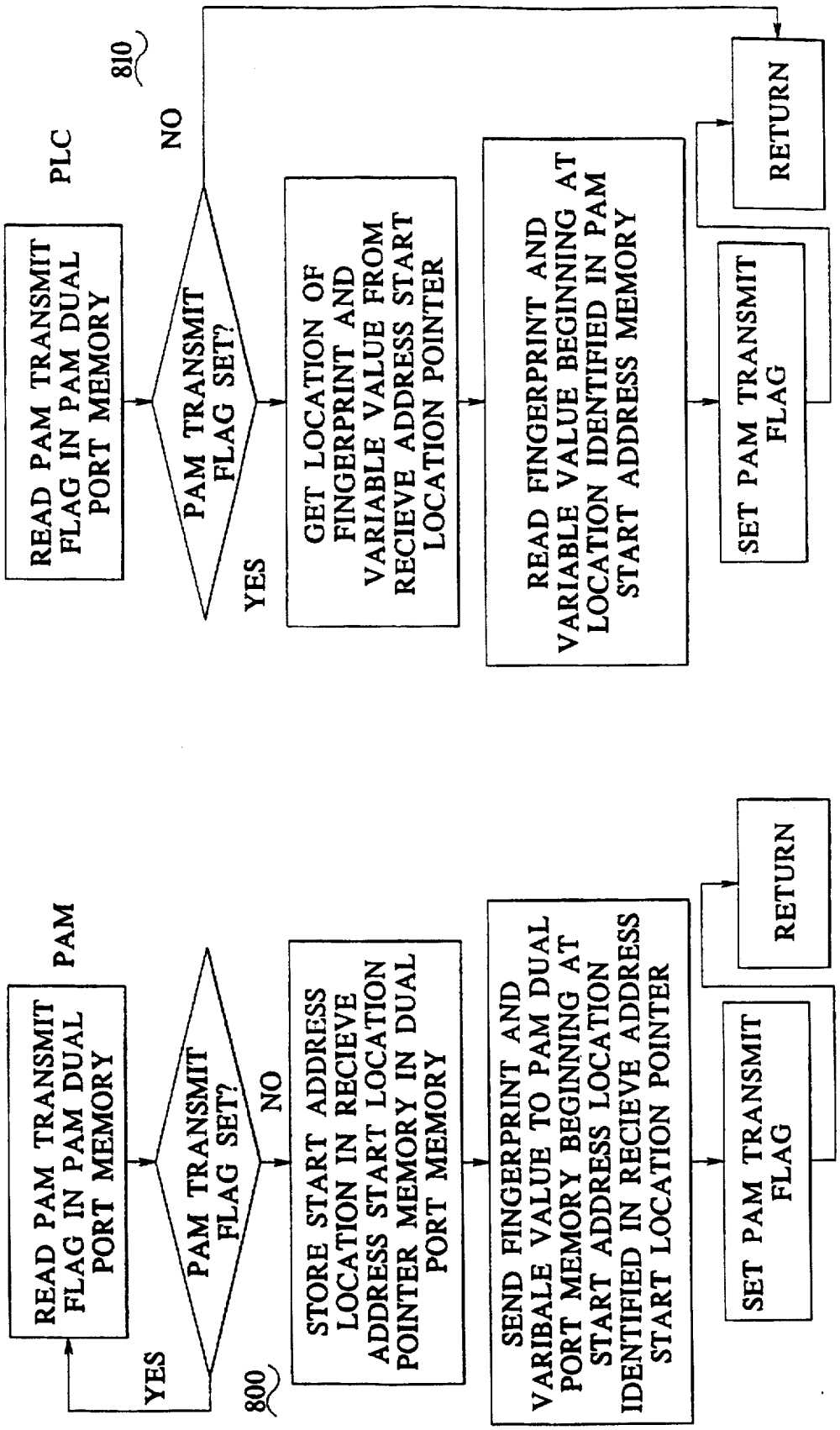
FIG. 13 is a flow diagram illustrating the tasks performed by the PAM and the PLC when the PAM transmits data to the PLC.

FIG. 13 illustrates a more detailed implementation of the data transmission of a PAM variable. The PAM tasks are illustrated generally at 800, while the PLC tasks are illustrated generally at 810. The PLC tasks 800 and PAM tasks 810 are being run concurrently by the PAM 80 and PAM 90 respectively.

With reference to the PAM tasks 800, the PAM 90 first reads the PAM transmit flag 695 in the PAM dual-port memory 150. A set PAM transmit flag 695 indicates that the PLC 80 has failed to complete reading of the immediately preceding fingerprint and variable value and, as such, the PAM 90 is not free to send a further fingerprint and variable value. Accordingly, the PAM 90 waits until the PAM transmit flag 695 is cleared. Once the PAM transmit flag 695 is cleared, the PAM 90 stores the start address location at the receive address start location pointer 700 in the transmit memory area 670 of the dual-port memory 150. The value stored in the receive address start location pointer 700 points to the address at which the PAM 90 will store the fingerprint and variable value in the receive memory area 670 of the dual-port memory 150. After storing the start address location, the PAM 90 sends the fingerprint and variable value to the receive memory area 670 of the dual-port memory 150 beginning at the start address location identified by the PAM 90 in the pointer 700. Once the fingerprint and variable value have been stored, the PAM 90 sets the PAM transmit flag 695 in the receive memory area 670 of the dual-port memory 150. The PAM 90 then returns, for example, to check for further PAM variables that must be sent by the PAM 90 to the PLC 80, or to read variables that have been transmitted from the PLC 80.

With respect to the PLC tasks 810, the PLC first reads the PAM transmit flag 695 in dual-port memory 150. If the PAM transmit flag 695 is not set, there is no PAM variable data to be read by the PLC 180. If, however, the PAM transmit 695 flag is set, the PLC 80 gets the location of the fingerprint and variable value from the location pointed to by the receive address start location pointer 700 in the receive memory area 670 of the dual-port memory 150. The PLC 80 acknowledges receipt of the fingerprint and variable value by clearing the PAM transmit flag 695. The PLC 80 then returns from the tasks 810 to, for example, transmit its own variable data values, or read further PAM variable values.

Figure 14:
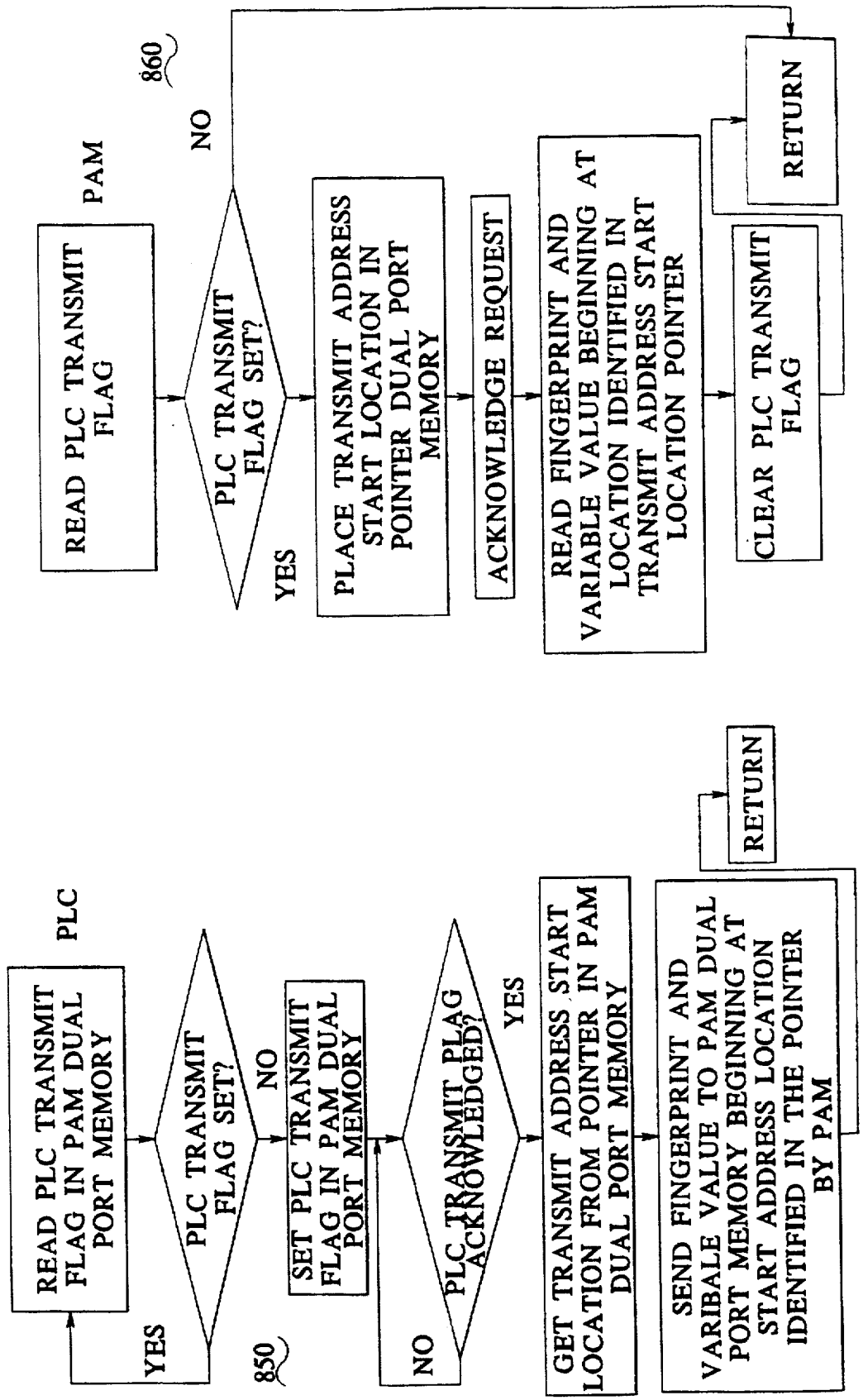
FIG. 14 is a flow diagram illustrating the tasks performed by the PLC and PAM when the PLC transmits a variable to the PAM.

FIG. 14 is a more detailed full diagram of the tasks that are executed by the PLC 80 and PAM 90 in transmitting a PLC variable from the PLC 80 to the PAM 90 PLC tasks are illustrated generally at 850 while the PAM tasks are generally illustrated at 860.

With respect to the PLC tasks 850, the PLC 80 first reads the PLC transmit flag 675 from the dual port memory 150. If the PLC transmit flag 675 is set, the PAM 90 has failed to complete reception of the immediately preceding PLC variable value that was sent. Accordingly, the PLC 80 does not attempt to send a further PLC variable.

Once the PLC transmit flag 675 has been cleared, the PLC 80 sets the PLC transmit flag 675 in the transmit memory area 660 of the dual port memory 150. A check is then made to determine whether the PAM 90 has acknowledged the receipt of the PLC transmit flag 675. Once the transmit flag has been acknowledged, as indicated by a ready of the acknowledge flag 685, the PLC gets the transmit address start location pointer 680 from the transmit memory area 660 of the dual port memory 150. The PLC 80 then stores the finger print and variable value to the dual port memory 150 beginning at the start address location identified in the transmit address start location pointer 680 identified by the PAM 90. The PLC 80 then returns from the transmit variable data tasks 850, for example, to receive PAM variable data or, to transmit further PLC variable data, execute further ladder logic processing, or exiting the user program.

With respect to the PAM tasks 860, the PAM 90 first reads the PLC transmit flag 675 to determine whether it is set. If it is in a set state, the PAM 90 identifies the location to which the PLC 80 is to store the finger print and variable data by placing the start address location in the transmit address start location pointer 680 in the transmit memory area 660 of the dual port memory 150. The PAM 90 then acknowledges the PLC transmit flag 675 by setting the PLC transmit flag acknowledge 685 thus allowing the PLC to send the finger print and variable value to the identified location. Once the request has been acknowledged, the PAM 90 reads the finger print and variable value beginning at the location identified in the transmit address start location pointer 680. The PAM 90 then clears the PLC transmit flag and returns to other tasks such as, for example, receiving further PLC variable data, transmitting PAM variable data, or executing further motion profile commands.

The data variables that are communicated between the PAM 90 and the PLC 80 may have a wide variety of functions. Exemplary data variables that are transmitted from the PLC 80 to the PAM 90 include:

(a) a system production variable that instructs the PAM 90 to begin executing a continuous production cycle upon detection of a start switch depression by the PLC 80 through the I/O interface 95;

(b) a system production stop variable, transferred upon the detection of a stop switch depression by the PLC 80 through the I/O interface 95, that instructs the PAM 90 to control the plurality of servo driven packaging stations to stop execution of a continuous production cycle;

(c) a system step production variable that instructs the PLC 80 to control the plurality of servo driven packaging stations to execute a single production cycle; and (d) a home variable that instructs the PAM 90 to place one or more of the servo driven packaging stations at a predetermined reference position. Exemplary values that may be communicated from the PAM 90 to the PLC 80 include:

(a) a power ON variable, transferred upon detection by the I/O 210 of power supplied to one or more servo driven packaging mechanism, that informs the PLC 80 that power is supplied to the particular servo driven packaging mechanism;

(b) a position error variable that informs the PLC 80 that at least one of the servo driven packaging mechanisms has failed to reach a position within an allotted period of time; and (c) a torque error variable that informs the PLC 80 that at least one of the servo motors driving the plurality of servo driven packaging stations requires an excessive amount of torque to execute a predetermined movement.

The foregoing variable data structure and its corresponding implementation provide numerous advantages over traditional inter-processor communications. For example, the present system facilitates high speed communication between the processors in a resource efficient manner.

Further, system development may be made more efficient. In this respect, it should be noted that each version of the PAM software must be re-compiled before it is implemented within the PAM while the corresponding PLC software does not require such compilation. During system debugging, it may be desirable to limit communications between the PAM 90 and PLC 80 to only several variables. With the present system, both the PAM 90 and PLC 80 may be provided with a complete list of all system variables. During debugging, the PLC software may be used to identify those variables which are to be used during debugging without the necessity of re-compiling the PAM software.

The PAM 90 may be programmed to execute any number of motion profiles to carry out the various packaging process steps implemented by the packaging machine illustrated in FIGS. 1A and 1B. The motion profiles may be stored in the PAM or may be sent using the communicators described above, from the PLC in an "on the fly" fashion. Exemplary motion profiles are set forth in FIGS. 15–41. These motion profiles are applicable to filling, for example, a 70×70 mm gable top carton using processing stations 45, 50, and 55 such as those set forth in the foregoing identified patent applications.

The use of gearboxes and cams, driven by constant velocity motors, to effect mechanism motions usually constrains the mechanism motions to constant velocity, or sinusoidal acceleration, or "modified sine" acceleration profiles. The present system is not constrained in this fashion. Rather, the present system facilitates implementation of motion profiles that enable, not just the movement of a mechanism from point a to point b in time t, but also profiles with accelerations and velocities that can be tailored to minimize the constraints that, for example, amplifier current and voltage limits or product viscosities impose.

Motion profiles to be executed by, for example, the disclosed system using Socapel products, are coded as sequences of positions $p_i$ that vary from 0 to 1. Prior to execution of any particular motion profile the PAM 90:

1) multiplies each $p_i$ by a signed ($\pm$) scale factor equivalent to the maximum angular distance that we want the motor to rotate during any one machine cycle; and 2) adds to each scaled $p_i$ a signed offset magnitude that shifts the initial $p_i$ (and all subsequent $p_i$) forward or backward from the motor zero position.

The PAM 90 then assumes:

1) that the sequence of positions to be achieved by the motor during runtime will be spread out over the time of one machine cycle; and 2) the time interval between two adjacent $p_i$ is the same as any other two adjacent $p_i$.

Then the PAM 90 associates:

$p_0$ with $t_0$
$p_1$ with $t_1 = t_0 + \Delta t$
$p_2$ with $t_2 = t_1 + \Delta t$ ... $p_f$ with $t_f = t_{f-1} + \Delta t$ where $\Delta t$=machine cycle time/($\#p_f$−1).

An ideal motion profile may be defined in terms of the accelerations (sinusoidal, cosinusoidal, and constant) and positions that the motor is to achieve over the time of a machine cycle. Data points along the ideal position, velocity, and acceleration profiles may then be selected to preserve the shape of the acceleration curve. In practice, this may be between 90 and 360 samples per profile.

To ensure that the PAM 90 and the servomotors 16 are programmed with position profiles that they can execute smoothly, it is presently desirable to create position profiles that are derived from sequences of constant accelerations. To achieve this, the velocity profile that satisfies the initial acceleration and position profiles is utilized. Assuming that each velocity ($v_i$) will be achieved via a constant acceleration, each necessary acceleration ($s_i$) is calculated. The position points $p_i$ are then determined on the following equation:

$p_i = p_{i-1} + (v_{i-1} * \Delta t) + (\frac{1}{2} * s_{i-1} * \Delta t)^2$.

The following motion profiles may be implemented using the foregoing method.

Infeed Conveyor Motion Profile

Figure 15:
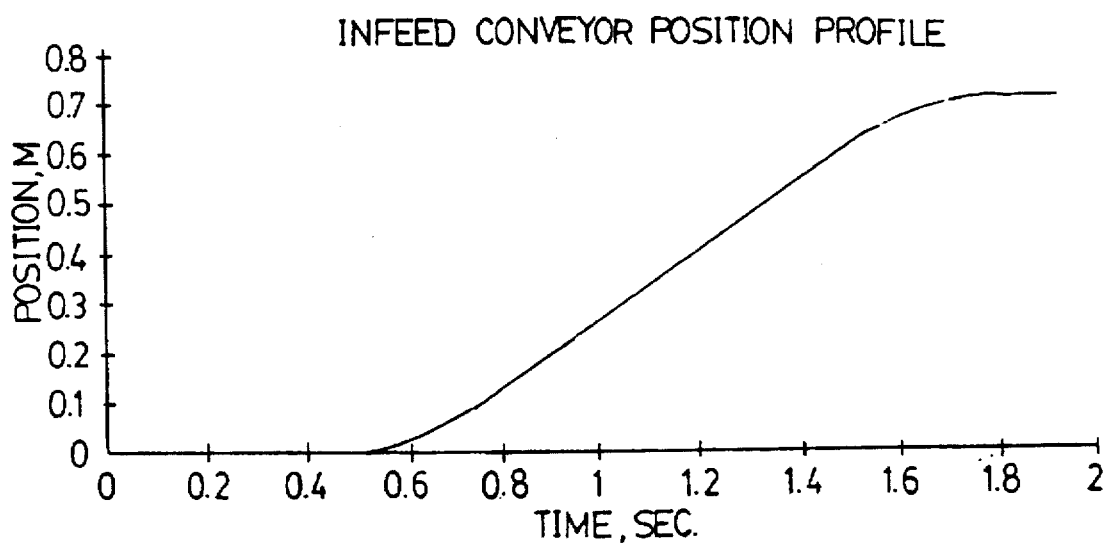
FIGS. 15–41 are exemplary motion profiles that may be executed by the mechanisms of the various package processing stations under control of the control system of FIG. 2.
Figure 16:
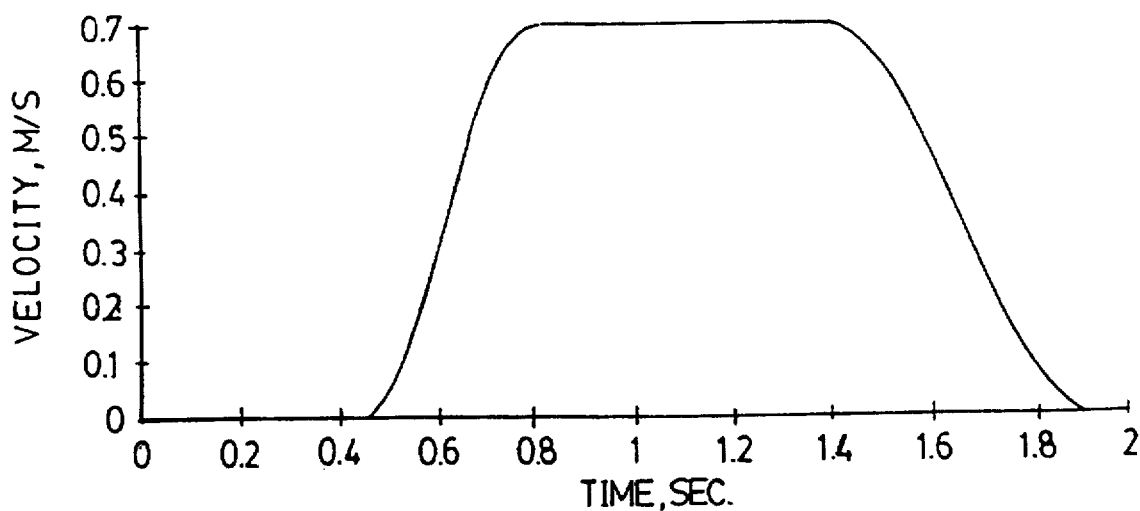
Figure 17:
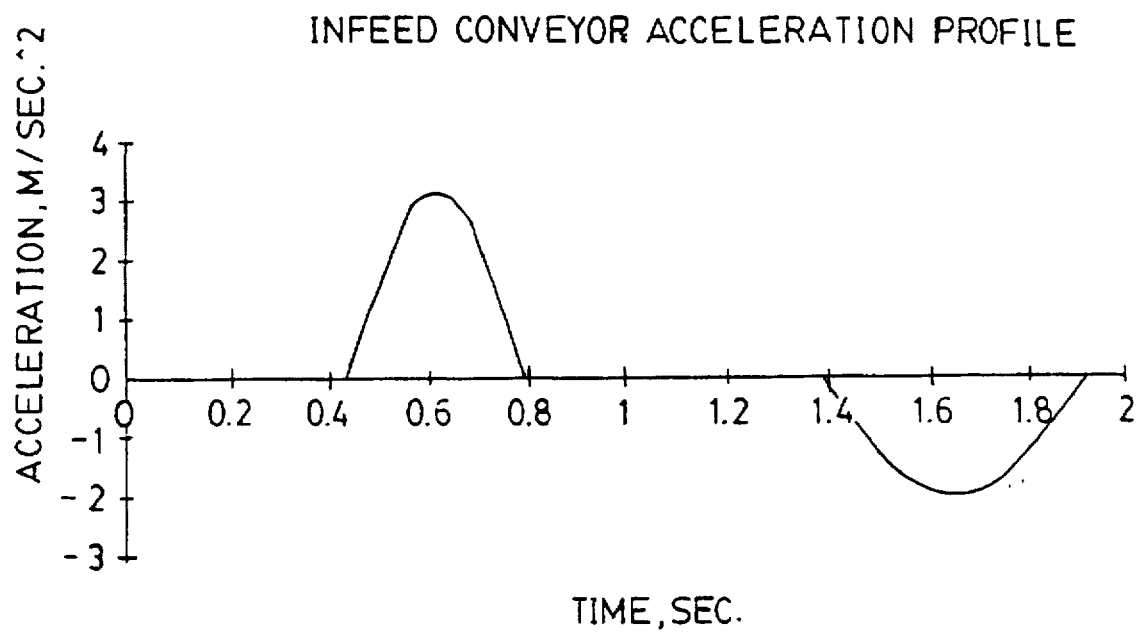

The motion profile for the infeed (or lower) conveyor 30 is set forth in FIGS. 15–17, which illustrate the position, velocity, and acceleration profiles respectively. Sinusoidal accelerations are utilized, instead of more rapidly rising accelerations, to minimize jerking of the pulleys 35, 40. The time of deceleration is made longer than the acceleration time to reduce the magnitude of deceleration. Higher pulley decelerations may cause the conveyor band to slip forward with respect to the pulley when the band is loaded with cartons thereby causing indexing errors.

Upper Conveyor Motor Profile

Figure 18:
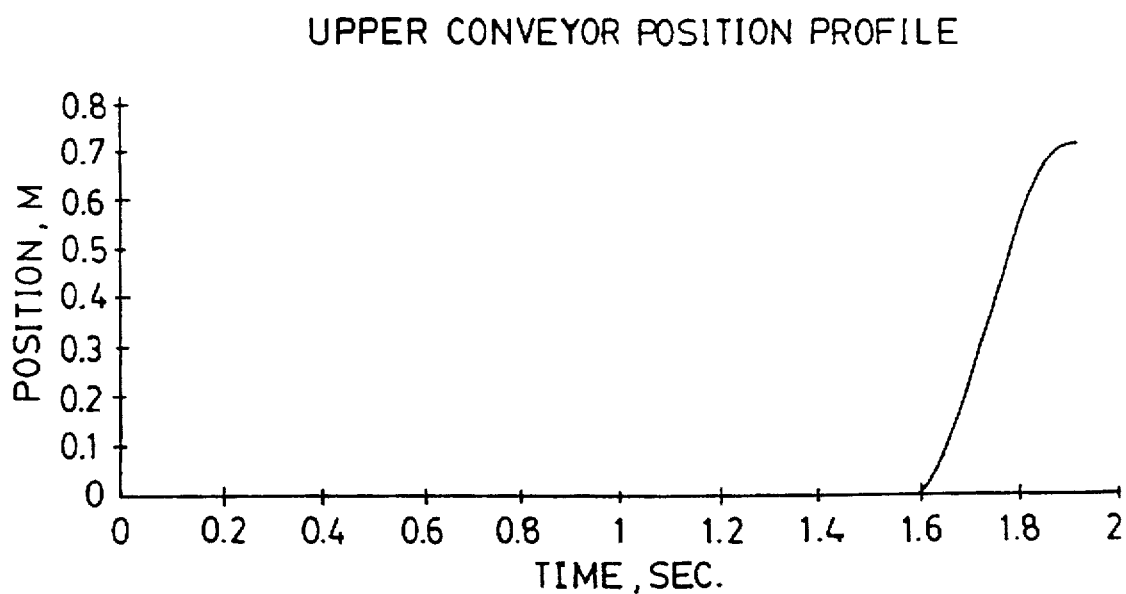
Figure 19:
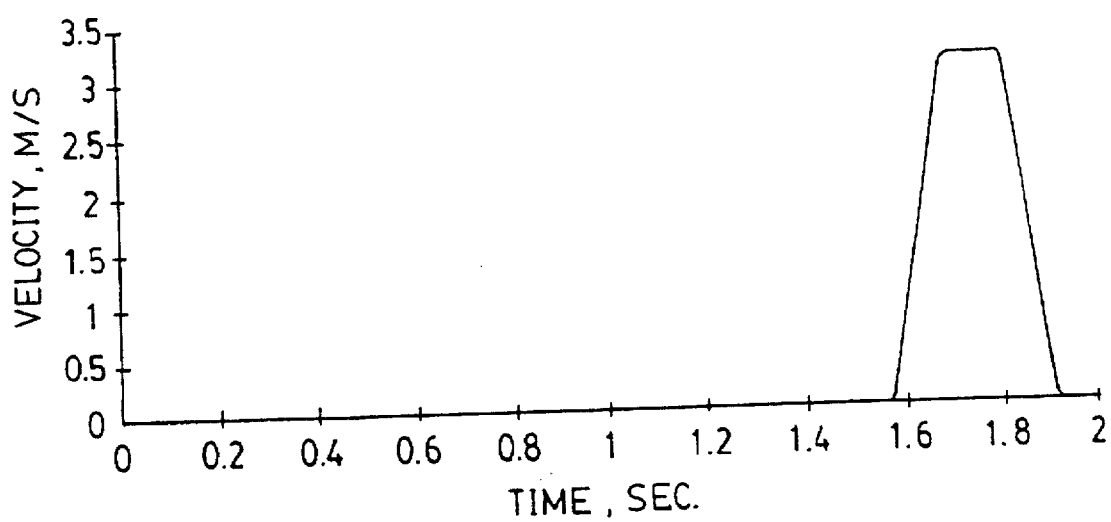
Figure 20:
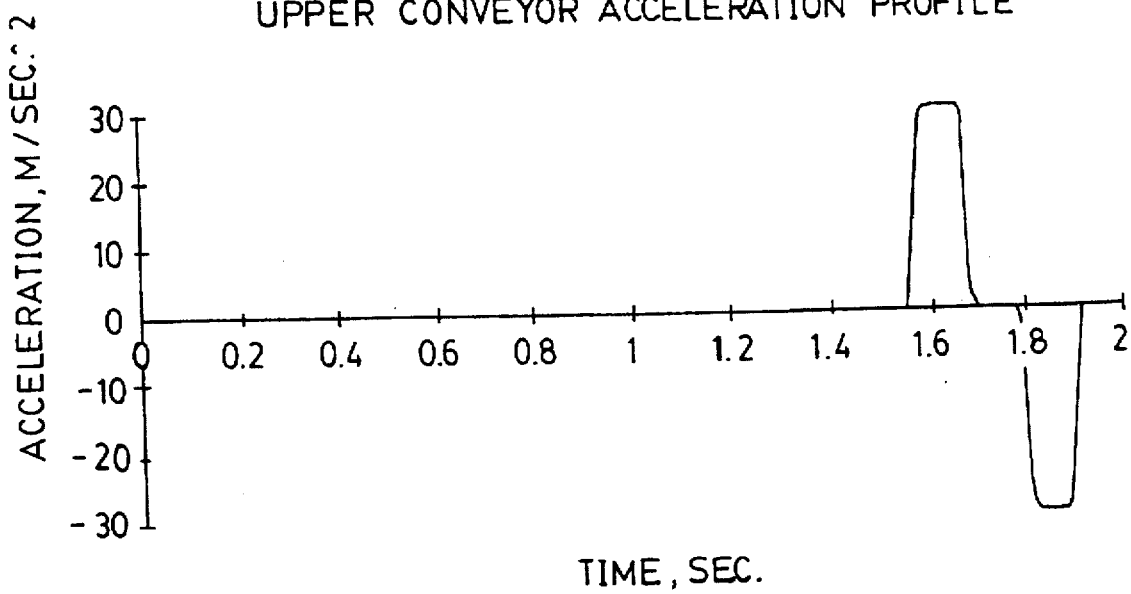

The upper conveyor 25 motion profile may proceed in accordance with the motion profile illustrated in FIGS. 18–20. This profile is basically a $\frac{1}{3}$rd, $\frac{1}{3}$rd, $\frac{1}{3}$rd trapezoidal velocity profile. Higher accelerations may outstrip the ability of the servo amplifier to supply current and voltage. During the time of any acceleration (or deceleration) 20% of the time is spent ramping up to constant acceleration and 20% of the time is spent ramping down to zero acceleration. The ramping of accelerations was implemented to limit jerking of the driven mechanisms.

Lifter Motion Profile

The lifter mechanism of station 45 is constructed in accordance with the teachings of the previously noted U.S. Ser. No. 08/315,410 application now U.S. Pat. No. 5,599,268 and includes a bottom lifter and top pre-folder, each driven by a respective servomotor. The motion profiles of the lifter mechanism are set forth in FIGS. 21–26.

Figure 21:
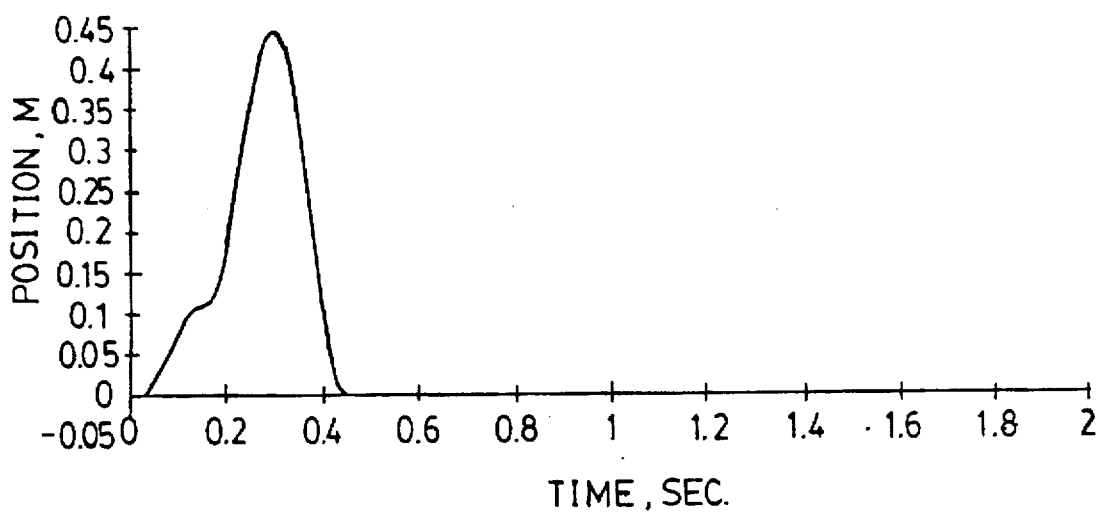
Figure 22:
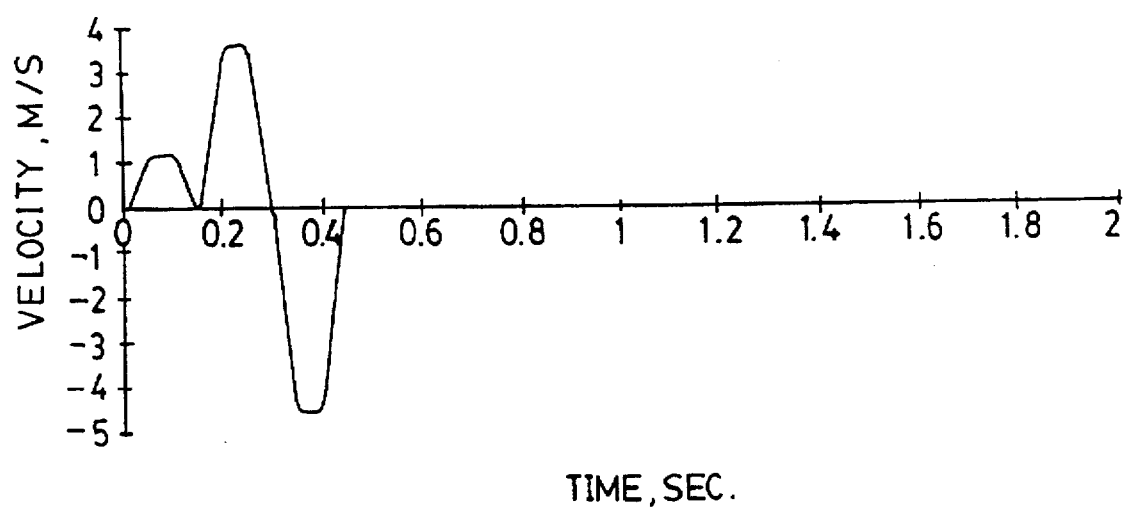
Figure 23:
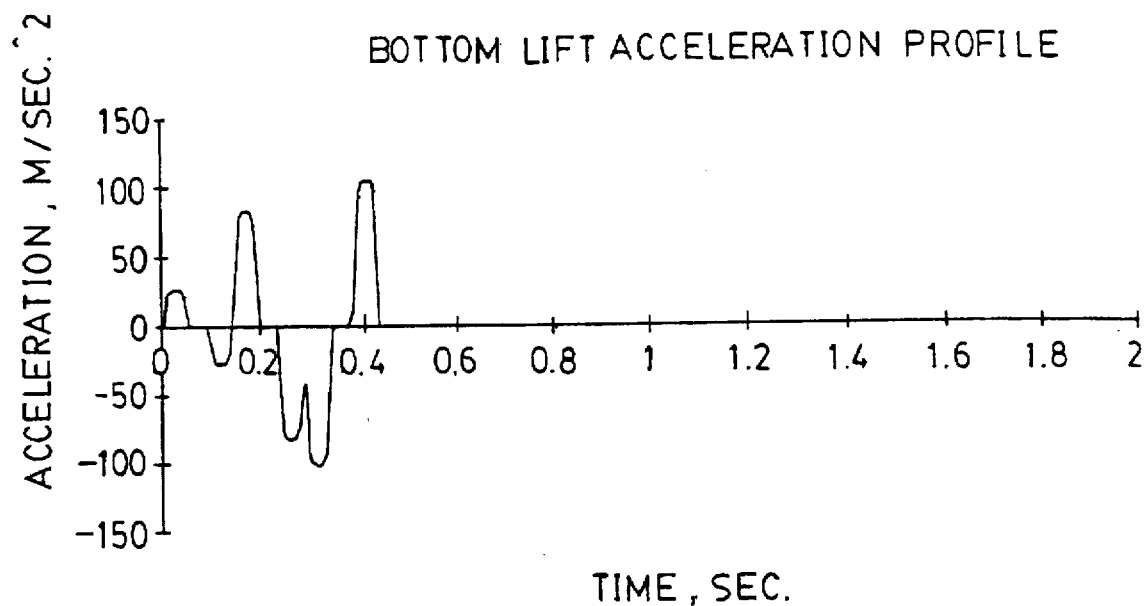

The motion profile for the bottom lifter is set forth in FIGS. 21–23 and consists of three moves. The first motor move lifts the forks up to the bottoms of the cartons in the lower conveyor band 30. The second move drives the forks up through the lower conveyor band 30 and into the upper conveyor band 25 so that the bottom sealing areas are of the cartons in the same plane as the jaws of the horn and anvil of the ultrasonic bottom sealer. The third move returns the forks down to their home position. The third move begins when the jaws of the sealer make contact with the bottom sealing areas of the cartons.

Each move of this profile is basically a $\frac{1}{3}$rd, $\frac{1}{3}$rd, $\frac{1}{3}$rd trapezoidal velocity profile. However, during the time of any acceleration (or deceleration) 20% of the time is spent ramping up to constant acceleration and 20% of the time is spent ramping down to zero acceleration. The ramping of accelerations was implemented to limit jerking of driven mechanisms.

Figure 24:
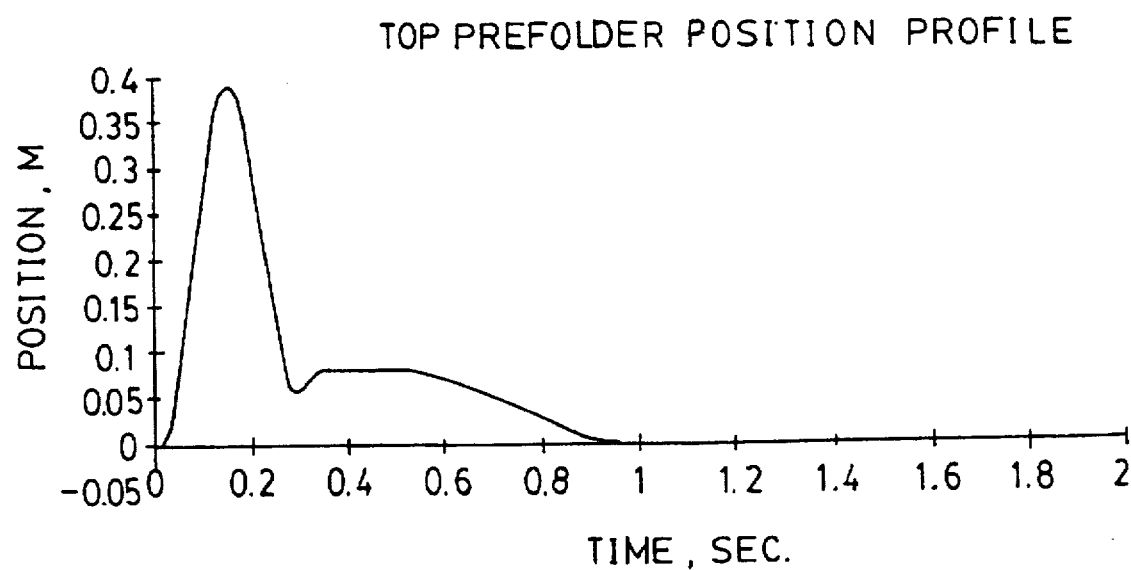
Figure 25:
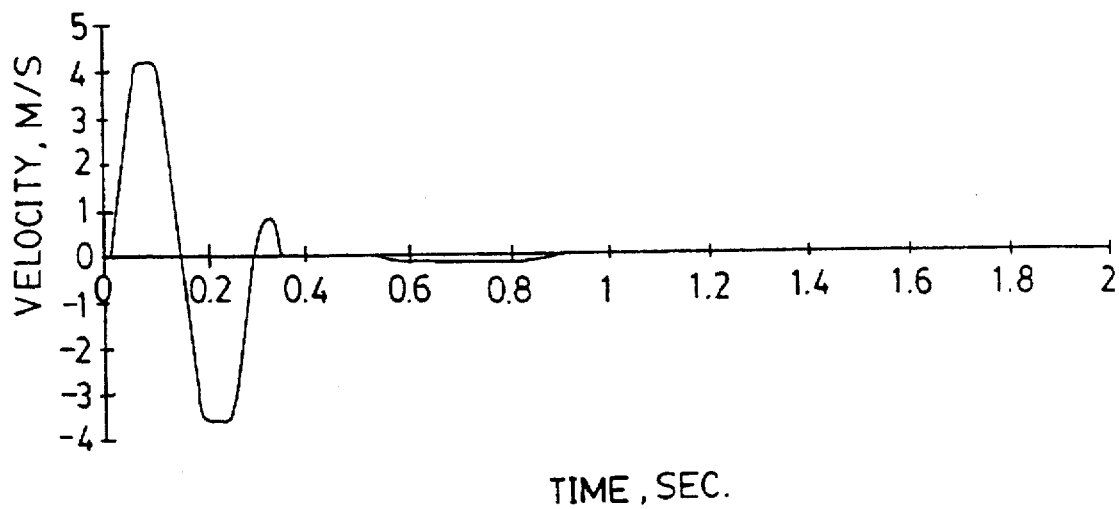
Figure 26:
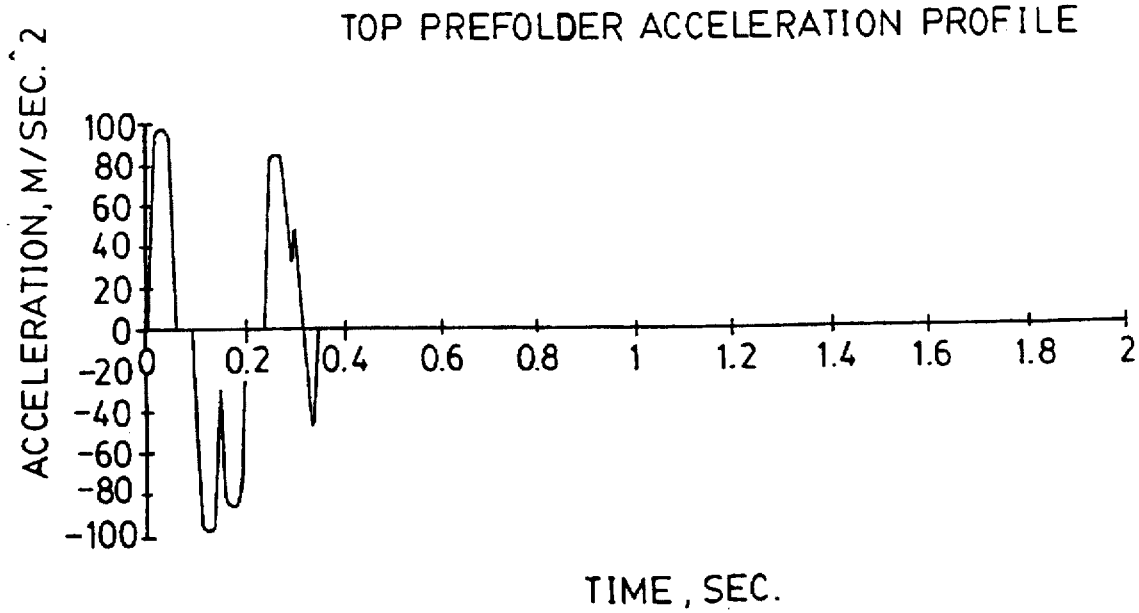

The motion profile for the top pre-folder is set forth in FIGS. 24–26 and consists of four moves. The first motor move drives the prefolder forks down through the upper conveyor band 25 into the lower conveyor band 30 to the level of the carton tops. Since the bottom lift forks arrive at the carton bottoms at the same time, the bottom lift forks and the prefolder forks secure the cartons. The second move draws the prefolder back up through the upper conveyor band 25. This second move is similar to the second move of the bottom lift but in the opposite direction so that the cartons remain secure in the grips of both sets of forks. The third move drives the prefolder down a length sufficient to keep the bottom sealing surfaces of the cartons in the same plane as that of the bottom sealer jaws during jaw closure. Without this downward move of the prefolder, the bottom sealing surfaces of the cartons would slide over the sealer jaws during their closure. The third move begins when the sealer jaws have made contact with the bottom sealing surfaces of the carton. The fourth move draws the prefolder clear of the carton tops and up to its home position sometime before the upper conveyor band 25 moves. The retraction move begins after the sealer jaws have firmly gripped the carton bottoms.

Each move of the profiles of FIGS. 21–26 is basically a ⅓rd, ⅓rd, ⅓rd trapezoidal velocity profile. However, during the time of any acceleration (or deceleration) 20% of the time is spent ramping up to constant acceleration and 20% of the time is spent ramping down to zero acceleration. The ramping of accelerations was implemented to limit jerking of the driven mechanisms.

Bottom Sealer Motion Profile

The bottom sealer of station 45 may be constructed in accordance with the teachings of the previously noted U.S. Ser. No. 08/315,412 application (now U.S. Pat. No. 5,605,026). The ultrasonic bottom sealer disclosed therein includes a cam mechanism that is driven by a servomotor.

Figure 27:
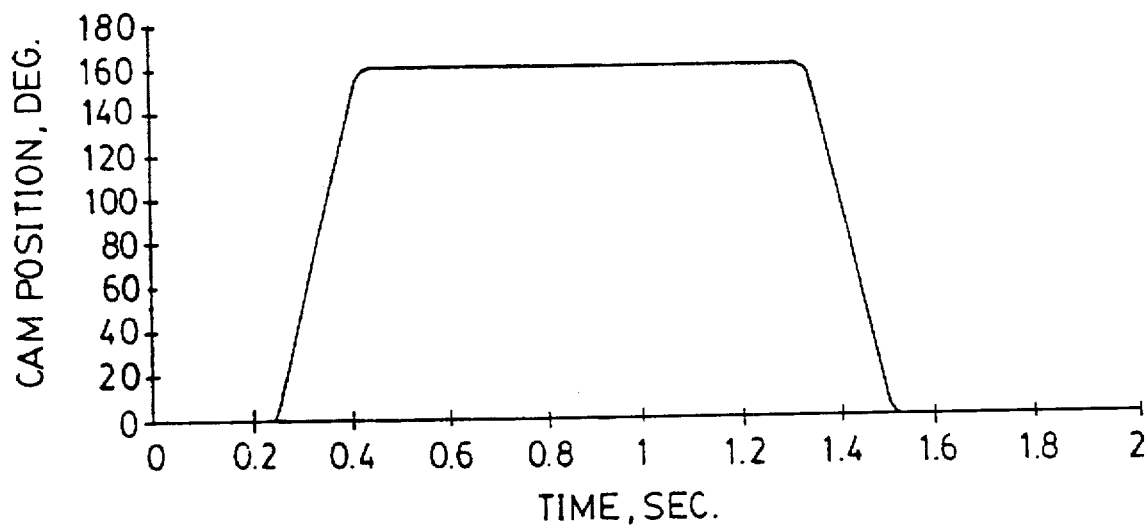
Figure 28:
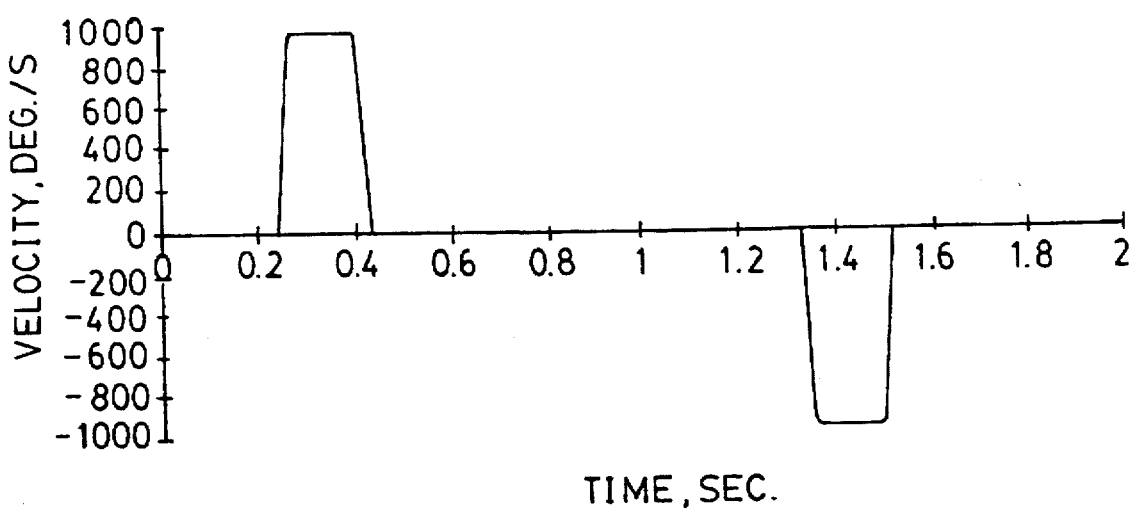
Figure 29:
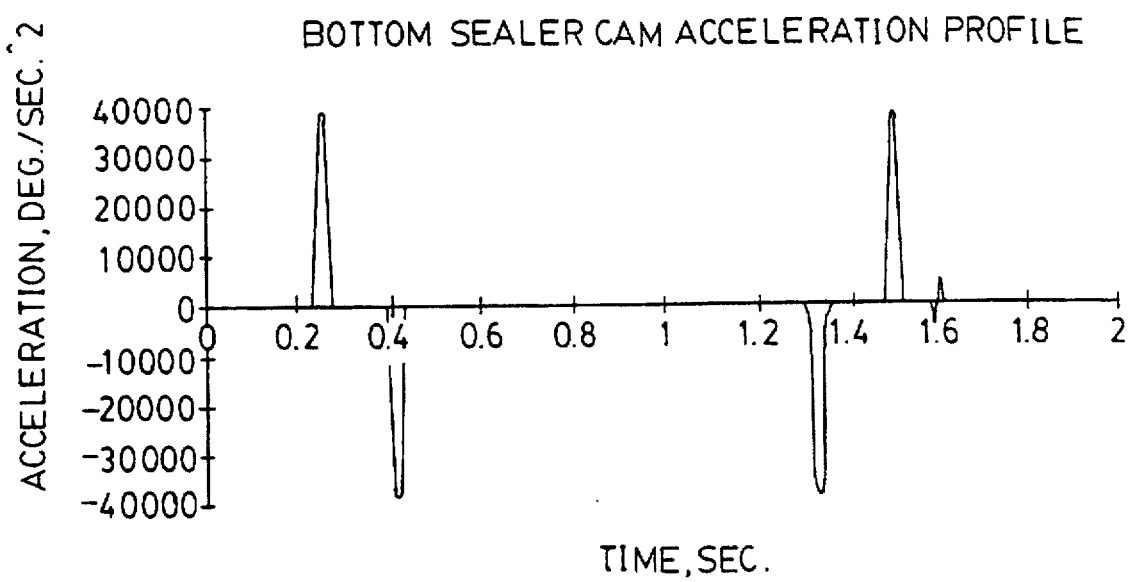

The motion profile for the bottom sealer is set forth in FIGS. 27–29 and includes two moves. The first motor move rotates the cams so that the sealer jaws close. The first motor move begins far enough in advance so that the jaws make contact with the carton bottoms just after the carton bottoms arrive in the plane of the jaws. The second motor move rotates the cams so that the sealer jaws open. Each move spends 15% of the move time accelerating, 70% of the move time at constant velocity, and 15% of the move time decelerating. The cams are shaped to move the jaws during the constant velocity portion of the move. Thus, the possibility of adding torques required to move the jaws to torques required to accelerate the cams is avoided.

Each move of this profile is basically a 15%, 70%, 15% trapezoidal velocity profile. However, during the time of any acceleration (or deceleration) 20% of the acceleration time is spent ramping up to constant acceleration and 20% of the acceleration time is spent ramping down to zero acceleration. The ramping of accelerations was implemented to prevent jerking of the driven mechanisms.

Fill Lifter Motion Profile

The fill lifter of processing station 50 may be constructed in accordance with the teachings of the U.S. Ser. No. 08/315,410 application (now U.S. Pat. No. 5,599,268) and the U.S. Ser. No. 08/315,401 application (now U.S. Pat. No. 5,517,801). Each of these applications, as previously noted, is incorporated by reference.

Figure 30:
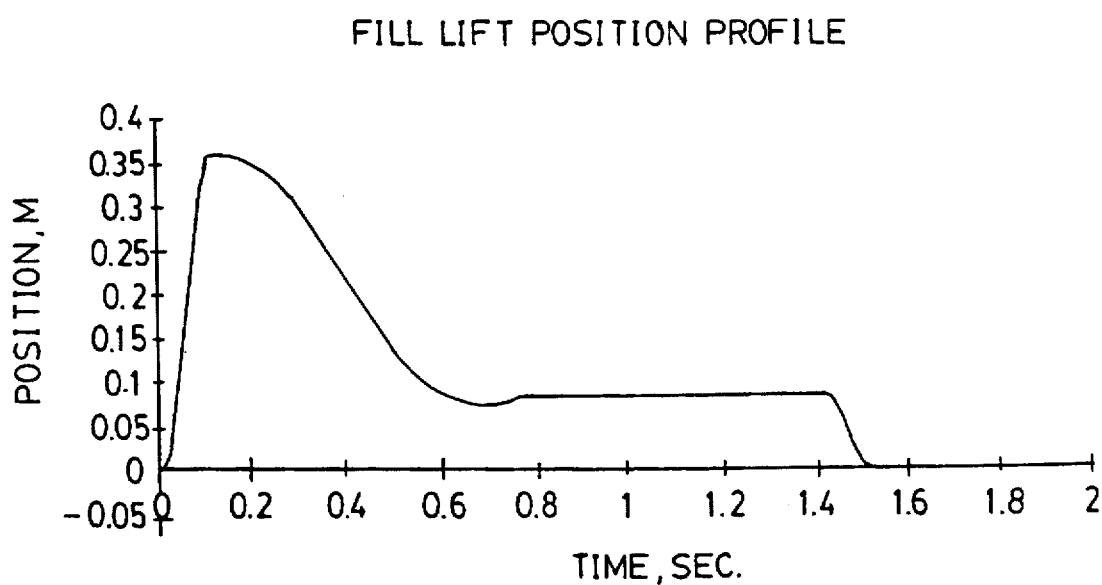
Figure 31:
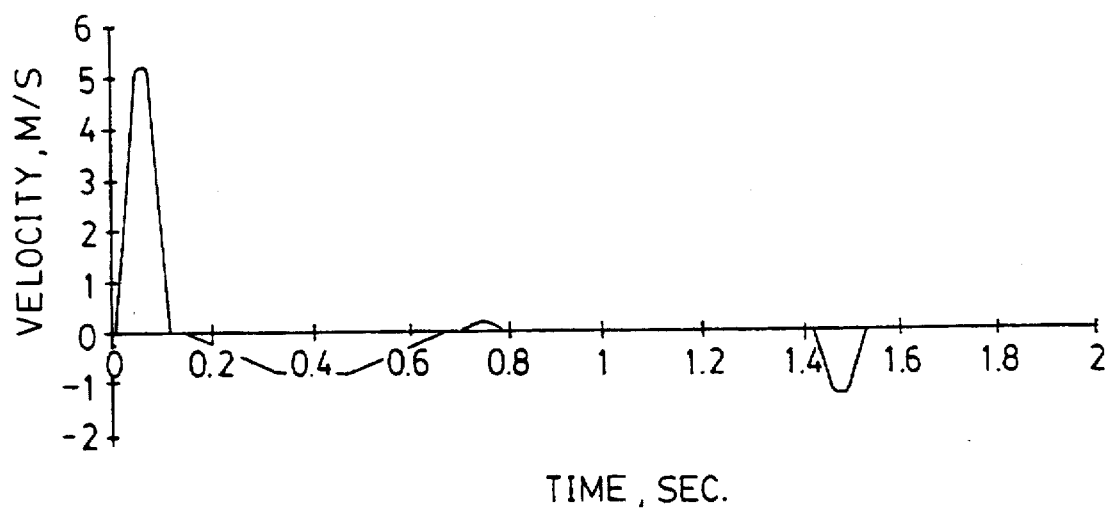
Figure 32:
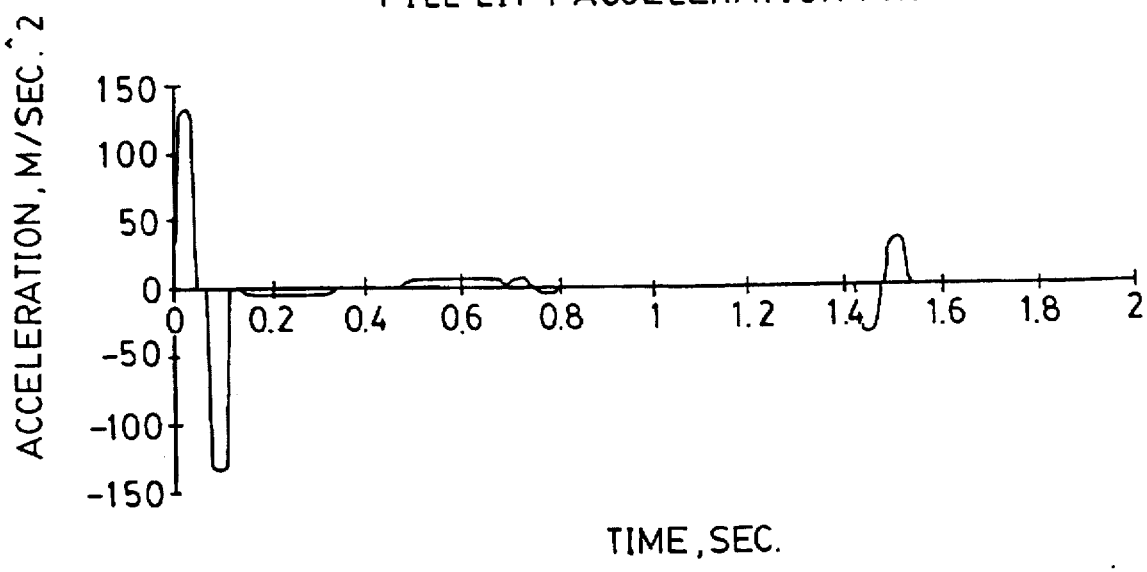

The motion profile for the lifter mechanism is set forth in FIGS. 30–32 and includes four moves. The first motor move drives the fill lift up through the upper conveyor band 25 and the cartons into the fill chambers of the filling stations proximate the fill nozzles. The distance moved is sufficient to bring the carton bottoms within a few mm of the bottom of the fill nozzles. The first move drives the lift up as quickly as possible. The accelerations have been ramped and made as small as possible to both minimize stress on the bands and couplings and to minimize demands on servo amplifier current.

The second move draws the lift down from the fill nozzle. It begins slightly after filling begins. The second move draws the lift down from the fill nozzle at velocities sufficient to keep the fill nozzle close to the level of the liquid as the liquid is dispensed. For hygienic reasons, the lifter mechanism moves down fast enough to prevent the liquid level from rising to levels that immerse the outside of the nozzles in the liquid. To minimize splashing and foam, the lift mechanism moves down slow enough to keep the liquid level close to the bottom of the nozzles. The second move ends when the top sealing areas of the cartons are in the plane of the top sealer jaws.

The third move drives the fill lift up a length sufficient to keep the top sealing surfaces of the cartons in the same plane as that of the top sealer jaws during jaw closure. Without this upward move of the fill lift, the top sealing surfaces of the carton may slide under the sealer jaws during their closure. The third move begins when the sealer jaws have made contact with the bottom sealing surfaces of the carton.

The accelerations of the third move have been limited to ~0.5 g to assist in preventing carton bulging and food spray. Food sprays are undesirable for hygiene reasons. Bulging cartons are likewise undesirable. First, they are difficult to handle without damage, because the bulging implies an internal pressure that can abet carton leaks. Further, bulging implies extra oxygen in the carton that can degrade product taste.

The fourth move draws the fill lift down to its home position sometime before the upper conveyor band 25 indexes. The retraction move begins after the sealer jaws of the top sealer have released the carton tops.

Each move of this profile is basically a 40%, 20%, 40% trapezoidal velocity profile. However, during the time of any acceleration (or deceleration) 20% of the time is spent ramping up to constant acceleration and 20% of the time is spent ramping down to zero acceleration. The ramping of accelerations was implemented to limit jerking of the driven mechanisms.

Fill Pump Motion Profile

The processing station 50 may include a fill pump that pumps liquid from a storage tank into the cartons. The fill pump includes a piston that reciprocate back and forth to alternately fill and empty a pump chamber. The piston may be driven by a screw mechanism that, in turn, is driven by a servomotor.

Figure 33:
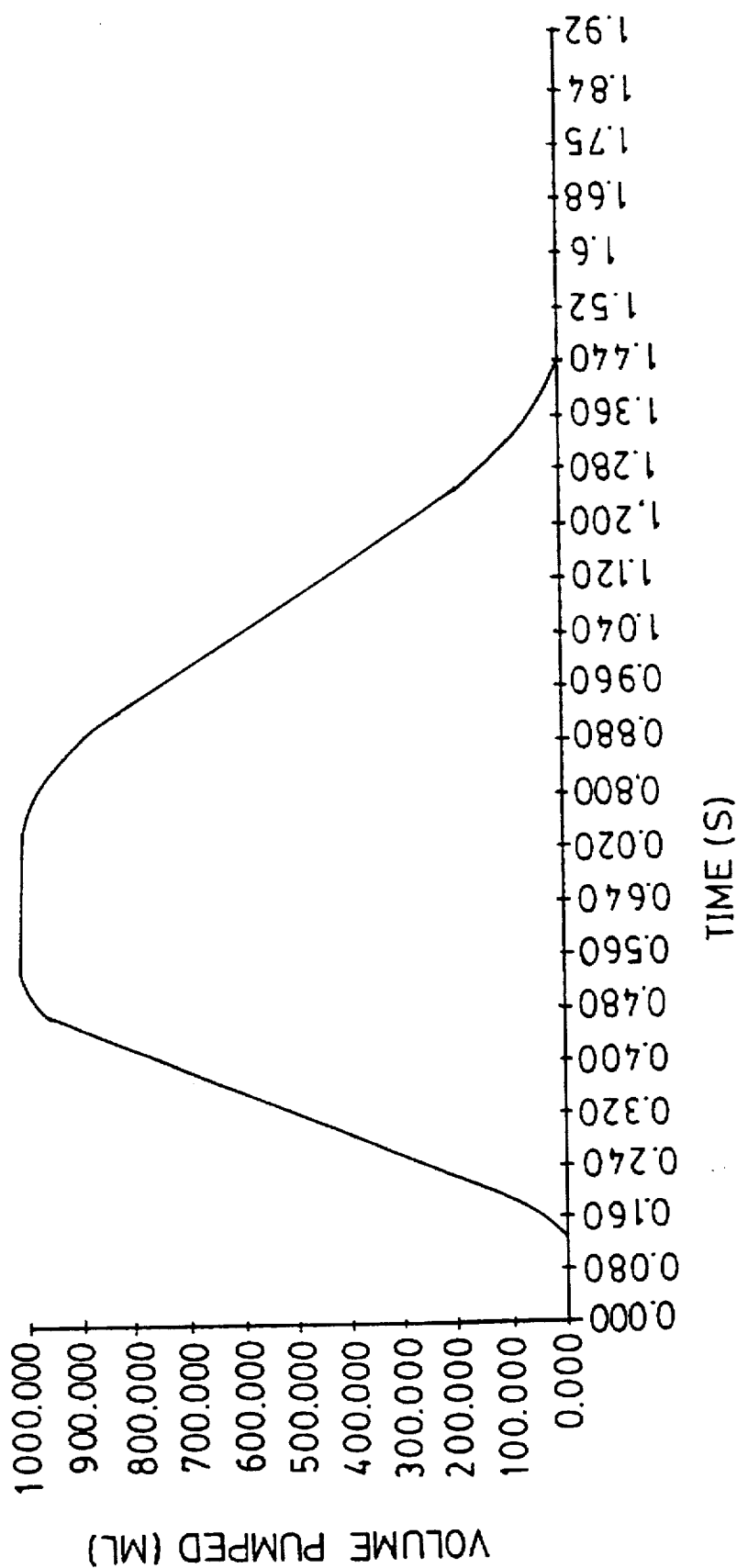
Figure 34:
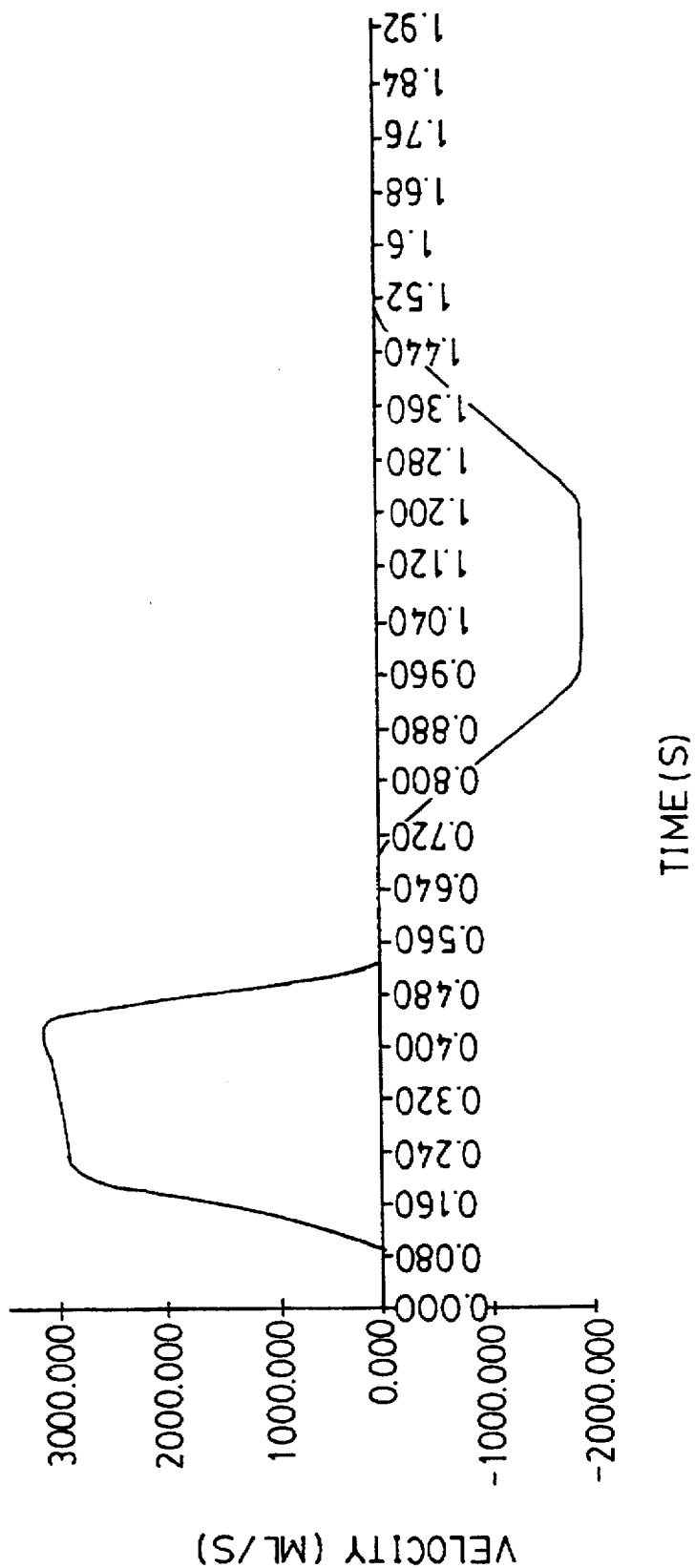
Figure 35:
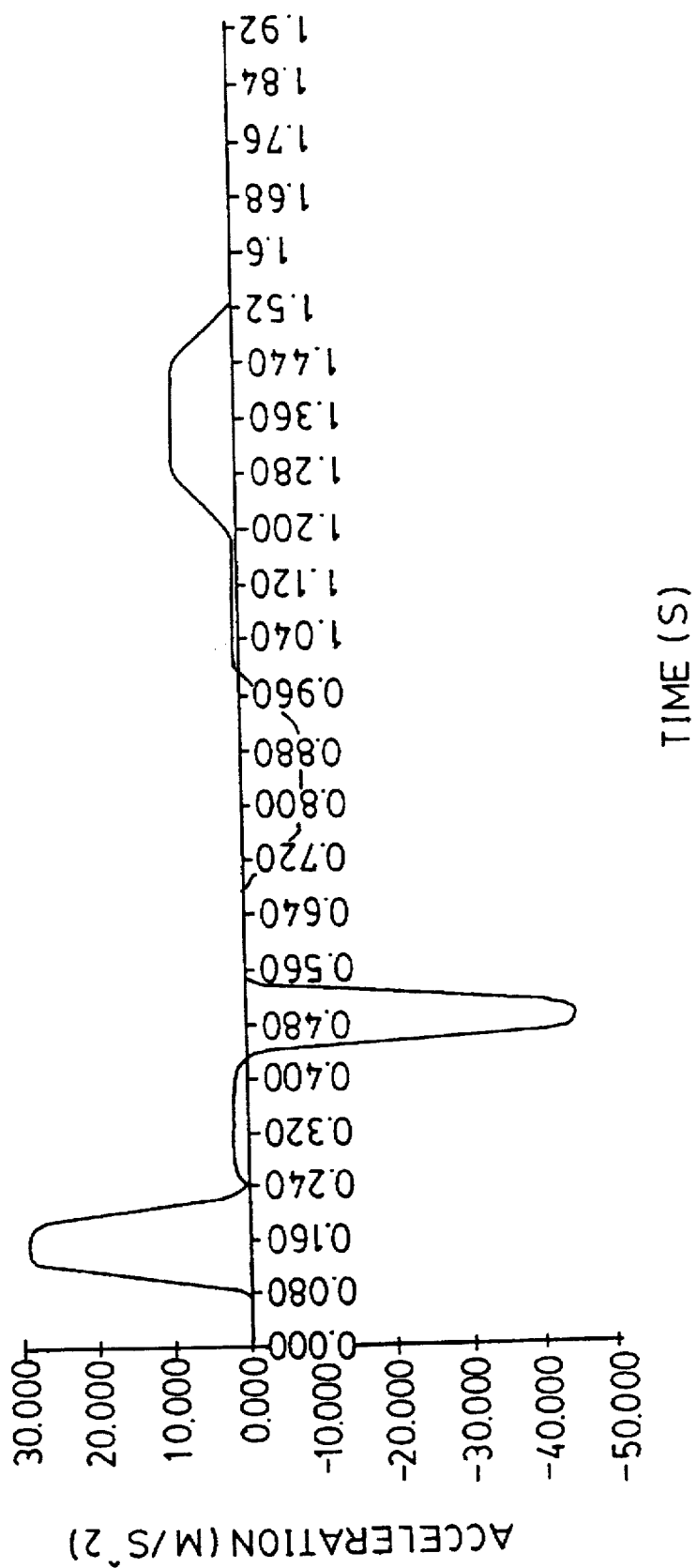
Figure 36:
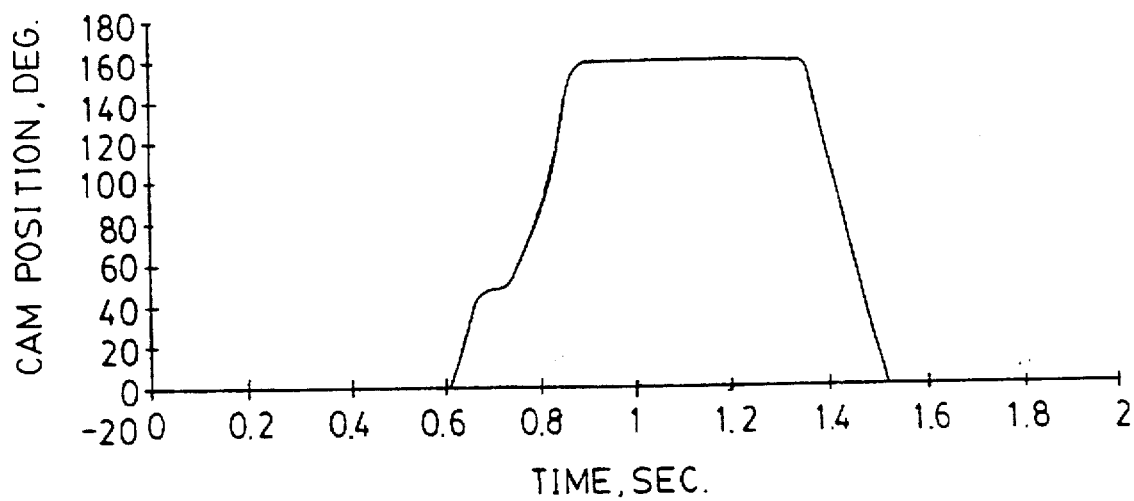

The motion profile for the fill pump is illustrated in FIGS. 33–35 and includes two moves. The first move—the fill move—drives the pump piston forward to drive liquid down through the fill nozzle and into the carton. The second move—the recharge move—drives the pump piston backward to draw liquid from the storage tank into the pump chamber.

The aim of the fill move is to get liquid into the carton as fast as possible. However, pump velocities must be kept below those velocities that cause unacceptable splash and foaming. During the first part of the fill move (the "acceleration" part of the move) the velocities can be, and are, increased dramatically as the liquid depth increases. After some characteristic depth is achieved, the rate of increase in liquid velocities must be slowed to keep splash and foaming to acceptable levels. This defines the second part (the "almost-constant-velocity" part) of the move.

During the third part of the fill move, deceleration is done as quickly as possible. The magnitude of the deceleration is related to the time required to close the outlet valve so that the liquid flow reaches zero at the same time that the outlet valve is closed. If the valve closes too early, an incorrect volume will be delivered to the package. Additionally, if the pump piston continues its stroke after the outlet valve closes, the increased fluid pressures will force a spray of liquid through the pump housing and diaphragm and out to various parts of the machine. Such an event compromises the hygiene of the machine. If the valve closes too late, then air will enter the nozzle and the pump chamber which will, again, cause an incorrect volume to be delivered to the package. The faster the deceleration, the more precise the timing of the valve closing has to be.

During the recharge move, accelerations and velocities are limited to prevent gasses from coming out of solution due to pressure reductions. Gas bubbles in the fill pump chamber may cause inaccurate liquid volumes to be delivered to the package. Pump accelerations are kept below those that keep flow accelerations below 1 g. Pump velocities are kept below those that enable flow velocities of 2 m/s or greater in the recharge pipes.

Top Sealer Motion Profile

The top sealer of station 50 is, for example, constructed in accordance with the teachings of the U.S. Ser. No. 08/315,412 application (now U.S. Pat. No. 5,605,026). That application, as noted above, is incorporated by reference.

Figure 37:
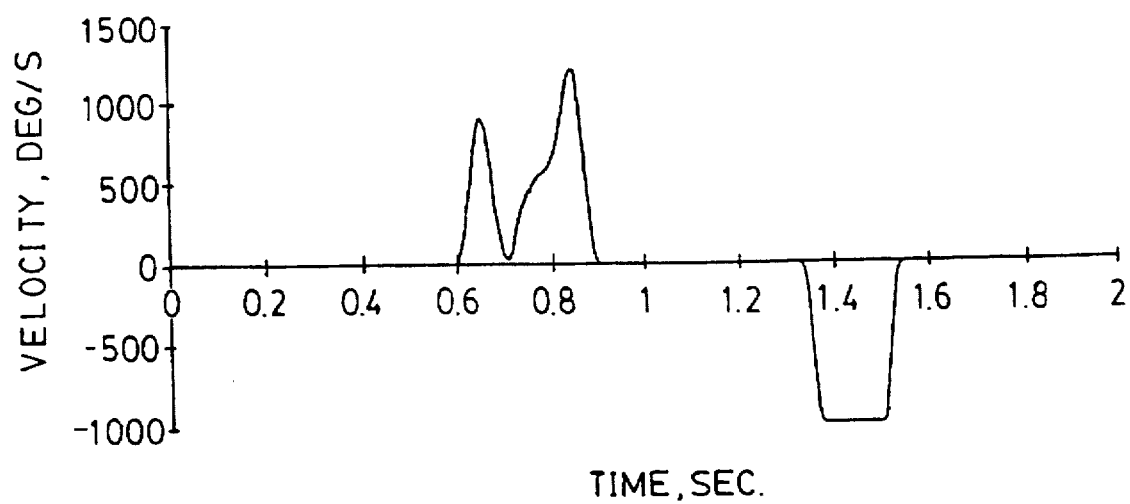
Figure 38:
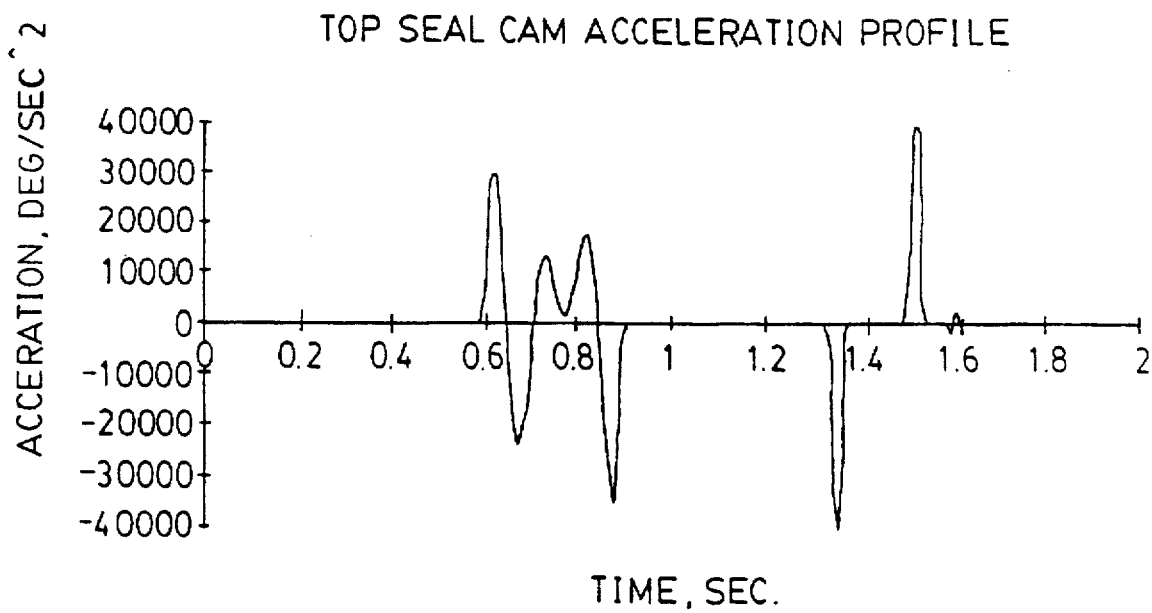
Figure 39:
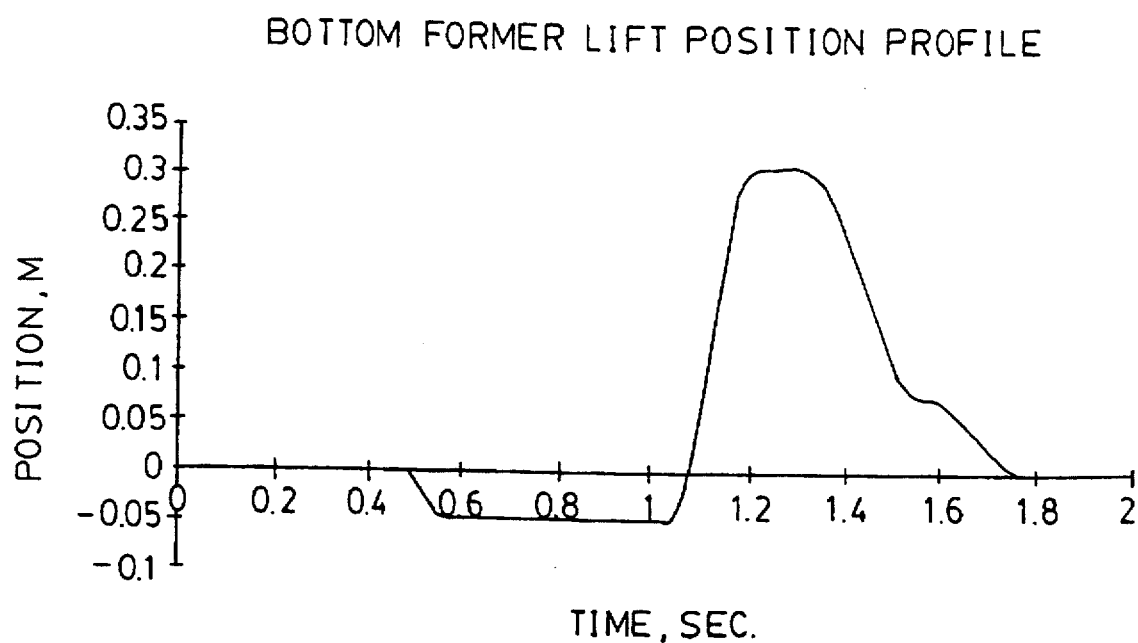

The motion profile for the top sealer is set forth in FIGS. 37–39 and includes two moves which drive the cam. The first move of this profile closes the top sealer jaws. It is an atypical move consisting of three polynomial splines. The first spline rotates the cams so that the jaws make contact with the top sealing areas of the cartons simultaneously with their arrival at the jaws. The cams arrive at that point with a very low velocity. The low cam velocity is selected so that the jaw velocities are small enough to give refold mechanisms, such as those described in U.S. Ser. No. 08/315,400 (now U.S. Pat. No. 5,518,578), entitled "Apparatus for Sealing the Fin of a Gabled Container", incorporated herein by reference, time to shape the carton tops for proper folding. At the same time it is desirable to have a velocity greater than zero so that the subsequent acceleration can be instituted without having to overcome static friction.

The second spline of the move rotates the cams until the jaws—and thus, the carton tops —are about 5 mm apart. It is desired that this move last 100 ms to continue giving time to allow the refold mechanisms to fold the cartons and, further, to allow excess air to escape from the cartons. It is also desired that the velocity at the end of the second spline be as low as possible while still enabling the jaws to finish closing in the next 100 ms via the third spline. The low velocity at the end of the second spline (and, thus, at the beginning of the third spline) extends the time for air escapment into the third spline. The third spline has to decelerate as fast as possible to complete the cam rotation and jaw closing in the allotted 100 ms.

The second move opens the top sealer jaws and is the same as the move that opens the bottom sealer jaws. That is, the move spends 15% of the move time accelerating, 70% of the move time at constant velocity, and 15% of the move time decelerating. During the time of any acceleration (or deceleration) 20% of the time is spent ramping down to zero acceleration. The ramping of accelerations is implemented to reduce jerking of the driven mechanisms.

Bottom Former Lift Motion Profile

Processing station 55 includes a bottom former that forms a flattened seating area from the gabled bottom of each carton. The bottom former may be constructed in accordance with the teachings of the U.S. Ser. No. 08/315,403 application (now U.S. Pat. No. 5,551,211). The bottom former thus includes a cup array that forms the carton bottoms and, further, transfers the cartons from the upper conveyor 25 to the outfeed mechanism. The cup array is moved by a linear activator (lifter) that is driven by a servomotor.

Figure 40:
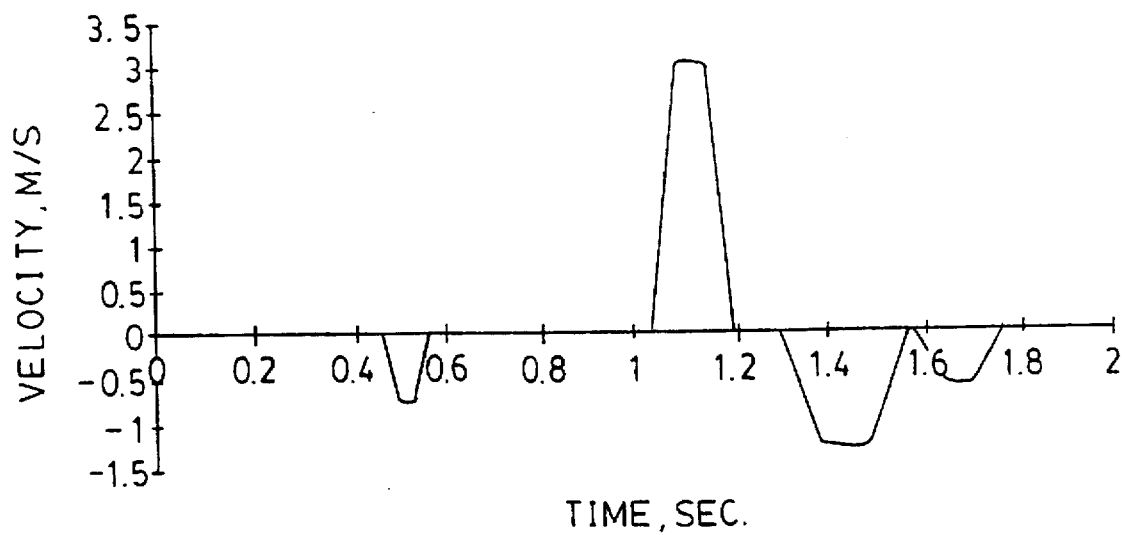
Figure 41:
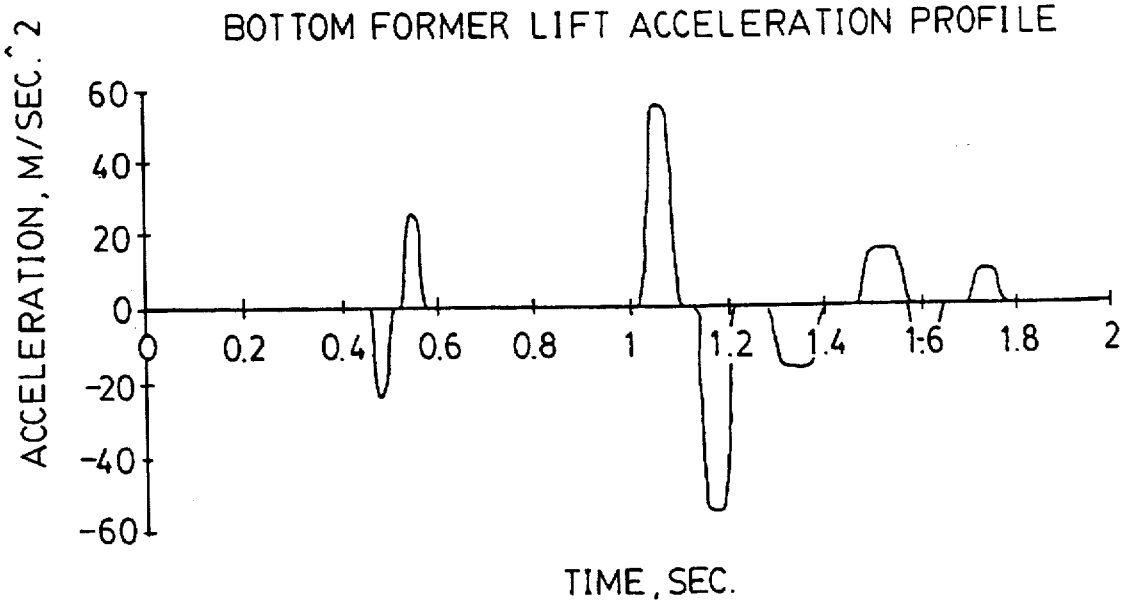

The motion profile for the lifter is set forth in FIGS. 39–41. The motion profile begins with the cartons already in the cups of the array. At this point the cups can move down whereas the cartons can not move down any further. The first motor move drives the cups down a sufficient distance to allow the ejecting mechanisms to drive the cartons from the cups and assure that the top edges of cups cannot "trip" the cartons when they are pushed horizontally out of the station. The cups have to remain at that level long enough for the pusher of the outfeed mechanism to shove the cartons out and then retract back out of the upward path of the cups.

The second move of the profile begins as soon as the pushers are clear of the upward path of the cups. The second move drives the lift up as fast as the servo amplifier can allow. Within the accelerations (or decelerations) of this move 20% of the time is spent ramping up to constant acceleration and 20% of the time is spent ramping down to zero acceleration. The ramping of accelerations is implemented to reduce jerking of the driven mechanisms. After the lift has finished the move up, it must dwell there long enough to allow the cup vacuum to drive the carton bottoms firmly into the cups.

After the dwell, the third move takes the cup array down as quickly as is necessary to reach a level at which the cartons are below any mechanism that would otherwise collide with the cartons and/or lift when the conveyor indexes. The smallest accelerations that enable the avoidance of collisions are desirable, first, to prevent the cups from leaving the cartons behind and, second, to keep the bottom folds of the carton as tight against the cup bottoms as possible.

The fourth move does not have to cope with any abnormal demands and, thus, is a leisurely drop down to the home position.

Slipping Correction

For a servo controlled packaging machine such as the one disclosed to perform properly, the machine's repeatability of motion should be within design specifications. In most cases, the specification for all motion axes to stop is ±0.5 mm of the designated stop position. For a well adjusted servo system motor operating freely, this stopping repeatability is not a problem. However, when the motors are linked via belts, chains, and gearboxes to actual physical mechanisms, the backlash and wear of gearboxes and the flex in the belts and chains may cause the final stopping position to be outside the acceptable tolerance limits.

Correction may be accomplished in the servo program through a correcting algorithm such as the one described below, which detects slippage while the motor is in operation, increases or decreases the motor speed to correct this slippage, and brings the motor to a halt at the correct position. This algorithm works in conjunction with the normal "motion profile" of the servo motor, and corrects for slippage on-the-fly during the normal operation and thus is able to complete the move in the designated time. The total machine cycle time is not altered due to this correction, and the machine is able to continually meet its production requirements. In addition, the correction algorithm also monitors the amount of slippage, and if the actual slippage exceeds a preset maximum allowance, the program may warn the operator of this excessive slippage. The operator, in turn, could check for mechanical damage or problems, and take corrective action.

Figure 42:
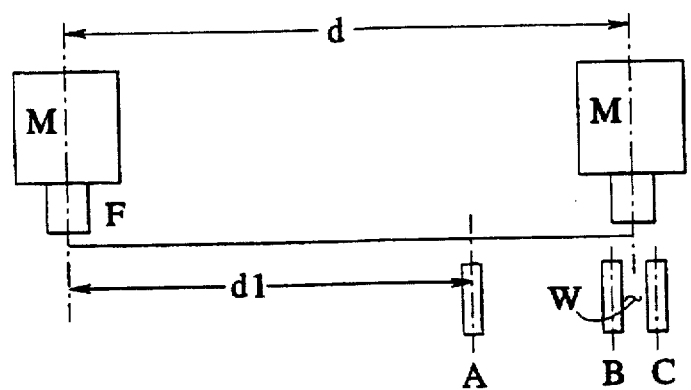
FIGS. 42 and 43 illustrate one algorithm for slip correction.

The operation of the correction algorithm is as follows and is understood with reference to FIGS. 42 and 43. Assuming that the distance the mechanism M moves is d in time t. The mechanism M contains a target flag F, which is noticed by the sensors A, B, and C positioned at certain intervals along the distance d. The width of the flag F is w, which is also the distance between the sensors B and C. Under normal operation, the mechanism M is commanded to move the distance d in time t, and when it comes to a halt, sensors B and C must be ON in order to guarantee that the mechanism did indeed move the distance d. However, if sensor B and C or both are OFF when the mechanism M completes the move, we can assume that the stop position of M is outside the acceptable limits for the next motion to continue.

This is where sensor A is used. Sensor A is placed at a distance $d_1$ from the start of the move of the mechanism M, and the flag F turns it ON briefly during its move after time $t_1$. The time $t_1$ when sensor A is turned ON is used to determine whether the motion of mechanism M is on-track as commanded or if there is some slippage. In essence, time $t_1$ is compared to a value $t_{ref}$ held in a register in the servo program, a value that is calculated from theoretical means if the mechanism M were to move as designed. However, due to slippage, $t_1$ could be different from $t_{ref}$.
If $t_1 > t_{ref}$ the mechanism M is lagging during its move $t_1 < t_{ref}$ the mechanism M is leading during its move By comparing the value of $t_1$ to $t_{ref}$ we can determine the amount and direction of slippage in the mechanism M, and correct for it.

Figure 43:
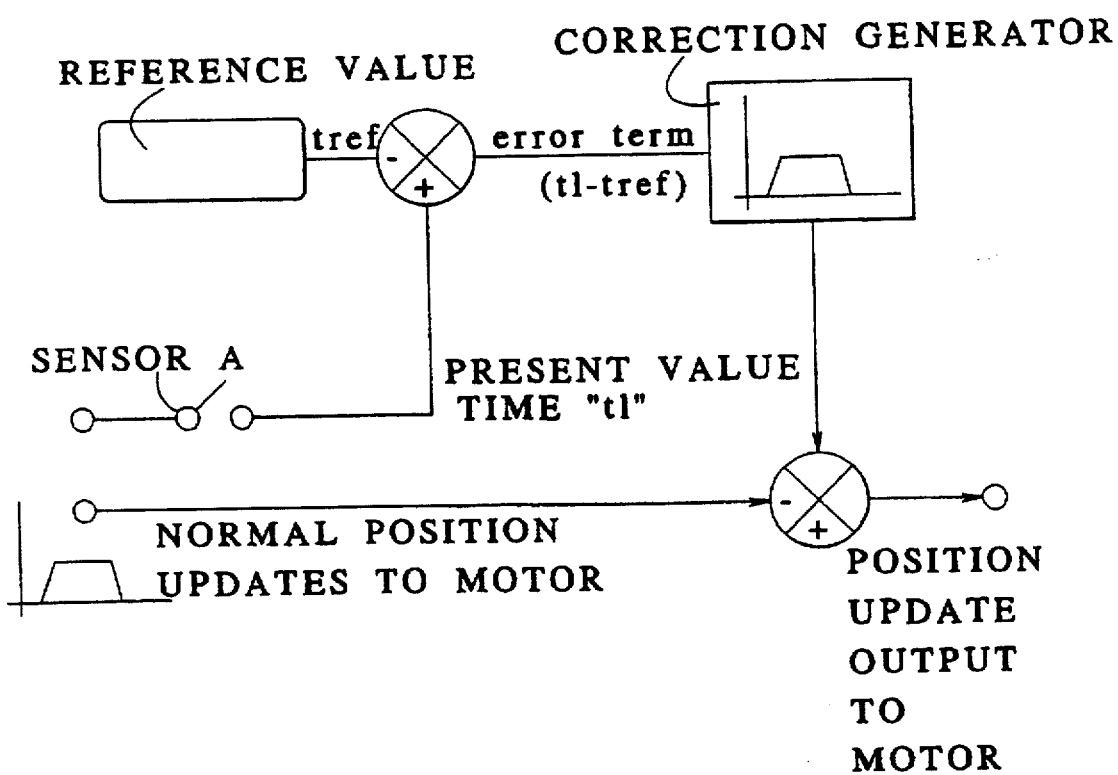

The correction is accomplished in a manner that may be understood with reference to FIG. 43. Under normal operation, position updates are provided to the motor, and the motor carries out the command. However, when the correction algorithm is engaged, an error term is calculated when the sensor A becomes ON. When sensor A is ON, the time $t_1$ value is noted and compared to the $t_{ref}$ value. The difference is then applied to a correction generator algorithm which converts the time difference to position difference, and adds the correction term to the normal input of position updates. This in turn is downloaded to the motor, which carries out this modified position update in order to reach the designated position at the right time.

Figure 44:
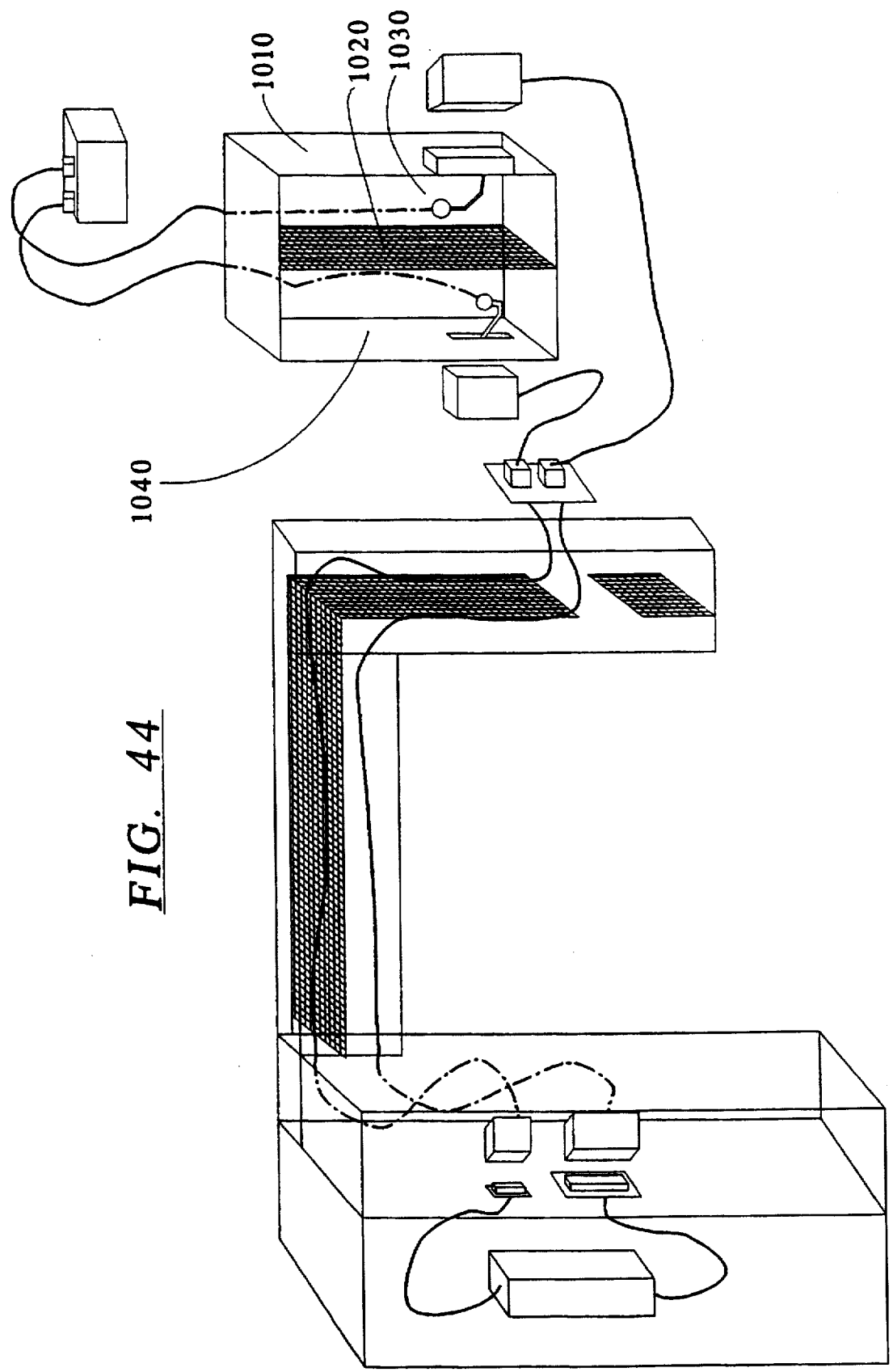
FIGS. 44 and 45 illustrate a modular circuit configuration that may be used in connection with each apparatus of each processing station.
Figure 45:
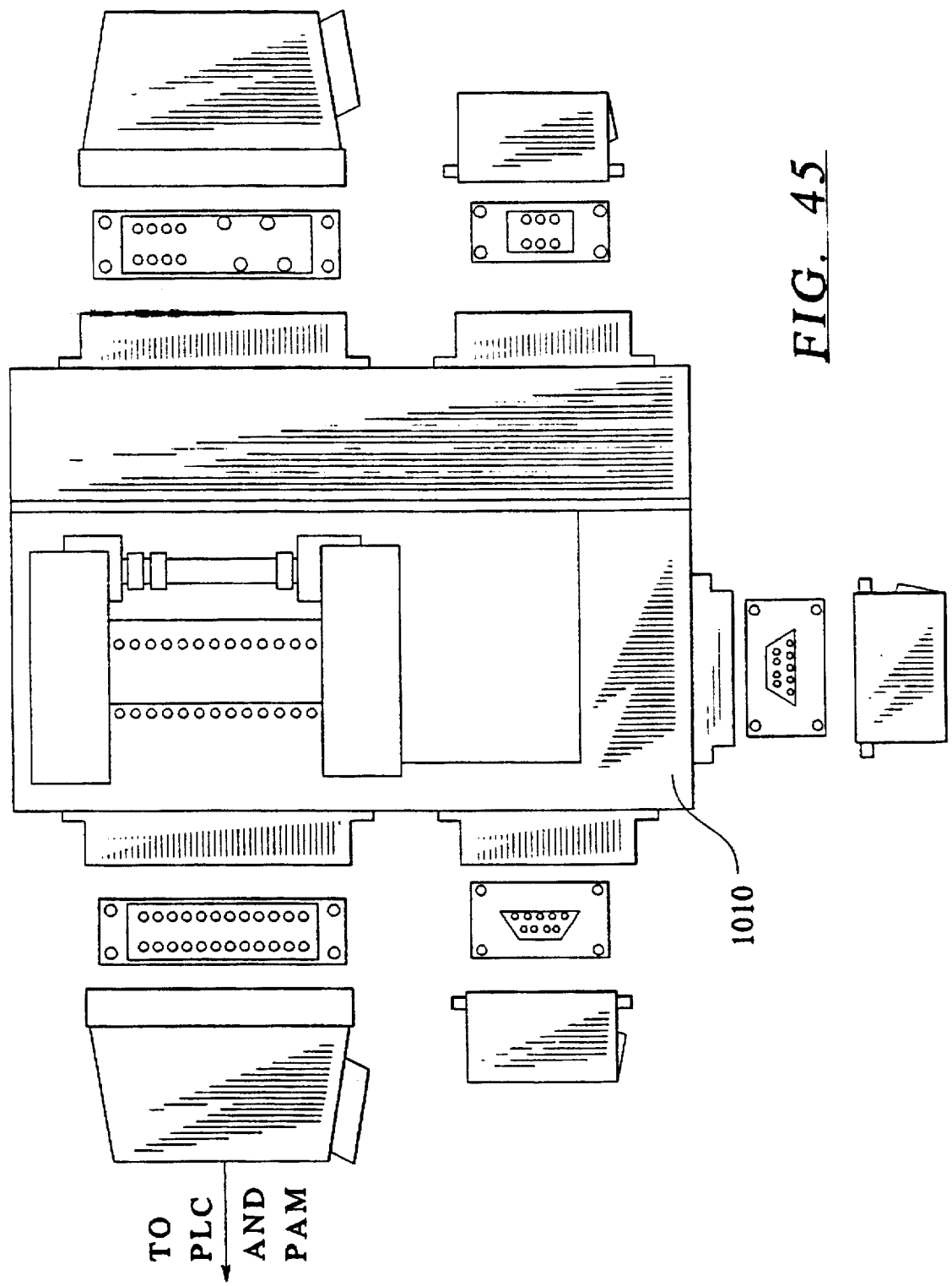

FIGS. 44 and 45 illustrate a modular-type connection box that may be associated with each apparatus of each processing station 45, 50, and 55. As illustrated, each apparatus may have a connection box 1010 that includes a plurality of signal and power connections. The box 1010 may include a noise shield 1020 disposed between the side 1030 of the box 1010 receiving power and side 1040 of the box 1010 receiving the signal and control lines.

Although the present invention has been described with reference to a specific embodiment, those of skill in the art will recognize that changes may be made thereto without departing from the scope and spirit of the invention as set forth in the appended claims.

We claim as our invention:

1. A packaging machine comprising:
    a plurality of servo driven packaging stations, each of the packaging stations executing one or more processes to fill and seal a carton and having one or more servomotors associated therewith;
    a plurality of servo amplifiers, each of the servo amplifiers being connected to a respective servomotor for control of the respective servomotor;
    a programmable axis manager connected to control the plurality of servo amplifiers;
    a programmable logic controller connected to receive and transmit input/output signals associated with the plurality of packaging stations, the programmable axis manager and the programmable logic controller being connected to a common communication bus; and
    communication means for transferring data variable values between the programmable logic controller and the programmable axis manager over the common bus using predetermined fingerprints assigned to each variable value.

2. A packaging machine as claimed in claim 1 and further comprising initialization means for placing the programmable axis manager and the programmable logic controller in a predetermined initialized state.

3. A packaging machine as claimed in claim 2 wherein the initialization means comprises:
    exchanging means for exchanging selected CRC values between the programmable axis controller and programmable logic controller, the selected CRC values identifying which variables are to be used in communications between the programmable axis manager and programmable logic controller at runtime; and
    assigning means for assigning the predetermined fingerprints corresponding to the selected CRC values, the predetermined fingerprints being used to identify each variable in subsequent communications between the programmable logic controller and programmable axis manager at runtime.

4. A packaging machine as claimed in claim 1 wherein the communication means comprises:
    flag means for allowing the programmable logic controller to signal the programmable axis manager that the programmable logic controller has a data variable to send to the programmable axis manager;
    identification means for identifying one or more memory locations that are disposed in the programmable axis manager to which the programmable logic controller is to write the predetermined fingerprint and the associated variable value, the identification means being responsive to the flag means; and
    transfer means for transferring the predetermined fingerprint and the associated variable value from the programmable logic controller to the one or more memory locations identified by the identification means.

5. A packaging machine as claimed in claim 1 wherein the communication means comprises:
    programmable logic controller transmit flag memory disposed in the programmable axis manager and accessible by the programmable logic controller over the common bus for storing a digital signal indicating to the programmable axis manager that the programmable logic controller has a data variable to send to the programmable axis manager;
    transmit data memory disposed in the programmable axis manager and accessible by the programmable logic controller over the common bus for storing the fingerprint and associated data variable that is to be sent from the programmable logic controller;
    transmit address identification memory disposed in the programmable axis manager and accessible by the programmable logic controller over the common bus for identifying the start address location of the transmit data memory to which the programmable logic controller is to write the predetermined fingerprint and associated data variable that is to be sent by the programmable logic controller; and
    transmit means for transmitting the predetermined fingerprint and the associated data variable to the transmit data memory address locations identified in the transmit address memory.

6. A packaging machine as claimed in claim 5 wherein the receive data memory and address memory are located in dual port memory disposed in the programmable axis manager.

7. A packaging machine as claimed in claim 6 wherein the programmable logic controller transmit flag memory is located within the dual port memory.

8. A packaging machine as claimed in claim 1 wherein the communication means comprises:

programmable axis manager flag means for allowing the programmable axis manager to signal the programmable logic controller that the programmable axis manager controller has a data variable to send to the programmable logic controller;

identification means for identifying one or more memory locations that are disposed in the programmable axis manager from which the programmable logic controller is to read the predetermined fingerprint and the associated variable value, the identification means being responsive to the flag means; and read means for reading the predetermined fingerprint and the associated variable value from the one or more memory locations identified by the identification means.

9. A packaging machine as claimed in claim 1 wherein the communication means comprises:

programmable axis manager transmit flag memory disposed in the programmable axis manager and accessible by the programmable logic controller over the common bus for storing a digital signal indicating to the programmable logic controller that the programmable axis manager has a data variable to send to the programmable logic controller;

receive data memory disposed in the programmable axis manager and accessible by the programmable logic controller over the common bus for storing the fingerprint and associated data variable that is to be read by the programmable logic controller;

receive address identification memory disposed in the programmable axis manager and accessible by the programmable logic controller over the common bus for identifying the start address location of the transmit data memory from which the programmable logic controller is to read the predetermined fingerprint and associated data variable that is to be sent to the programmable logic controller; and read means for allowing the programmable logic controller to read the predetermined fingerprint and the associated data variable from the receive data memory address locations identified in the receive address memory.

10. A packaging machine as claimed in claim 9 wherein the transmit data memory and address memory are located in dual port memory disposed in the programmable axis manager.

11. A packaging machine as claimed in claim 10 wherein the programmable axis manager transmit flag memory is located within the dual port memory.

12. A packaging machine as claimed in claim 1 wherein the plurality of packaging stations comprise a carton lifter mechanism.

13. A packaging machine as claimed in claim 12 wherein the communication means transfers a lifter mechanism home variable from the programmable logic controller to the programmable axis manager that instructs the programmable axis manager to place the lifter mechanism at a predetermined reference position.

14. A packaging machine as claimed in claim 12 wherein the servo amplifier that is connected to control the lifter mechanism is further connected to sense that power is supplied to the lifter mechanism.

15. A packaging machine as claimed in claim 12 wherein the communication means transfers a lifter mechanism power on variable from the programmable axis manager to the programmable logic controller that informs the programmable logic controller that power is supplied to the lifter mechanism.

16. A packaging machine as claimed in claim 12 wherein the communication means transfers a lifter mechanism position error variable from the programmable axis manager to the programmable logic controller that informs the programmable logic controller that the lifter mechanism has failed to reach a position within an allotted predetermined period of time.

17. A packaging machine as claimed in claim 12 wherein the communication means transfers a lifter mechanism torque error variable from the programmable axis manager to the programmable logic controller that informs the programmable logic controller that the servomotor driving the lifter mechanism requires an excessive amount of torque to execute a predetermined movement.

18. A packaging machine as claimed in claim 1 wherein the plurality of packaging stations comprise a carton pre-folder mechanism.

19. A packaging machine as claimed in claim 18 wherein the communication means transfers a pre-folder mechanism home variable from the programmable logic controller to the programmable axis manager that instructs the programmable axis manager to place the pre-folder mechanism at a predetermined reference position.

20. A packaging machine as claimed in claim 18 wherein the servo amplifier that is connected to control the pre-folder mechanism is further connected to sense that power is supplied to the pre-folder mechanism.

21. A packaging machine as claimed in claim 18 wherein the communication means transfers a pre-folder mechanism power on variable from the programmable axis manager to the programmable logic controller that informs the programmable logic controller that power is supplied to the pre-folder mechanism.

22. A packaging machine as claimed in claim 18 wherein the communication means transfers a pre-folder mechanism position error variable from the programmable axis manager to the programmable logic controller that informs the programmable logic controller that the pre-folder mechanism has failed to reach a position within an allotted predetermined period of time.

23. A packaging machine as claimed in claim 18 wherein the communication means transfers a pre-folder mechanism torque error variable from the programmable axis manager to the programmable logic controller that informs the programmable logic controller that the servomotor driving the pre-folder mechanism requires an excessive amount of torque to execute a predetermined movement.

24. A packaging machine as claimed in claim 1 wherein the communication means transfers a system production variable from the programmable logic controller to the programmable axis manager that instructs the programmable axis manager to control the plurality of servo driven packaging stations to execute a continuous production cycle.

25. A packaging machine as claimed in claim 1 wherein the communication means transfers a system production stop variable from the programmable logic controller to the programmable axis manager that instructs the programmable axis manager to control the plurality of servo driven packaging stations to stop execution of a continuous production cycle.

26. A packaging machine as claimed in claim 1 wherein the communication means transfers a system step production variable from the programmable logic controller to the programmable axis manager that instructs the programmable logic controller to control the plurality of servo driven packaging stations to execute a single production cycle.

27. A packaging machine as claimed in claim 1 wherein the communication means transfers a home variable from the programmable logic controller to the programmable axis manager that instructs the programmable axis manager to place one or more of the servo driven packaging stations at a predetermined reference position.

28. A packaging machine as claimed in claim 1 wherein the communication means transfers at least one power on variable from the programmable axis manager to the programmable logic controller that informs the programmable logic controller that power is supplied to at least one servo driven packaging mechanism.

29. A packaging machine as claimed in claim 1 wherein the communication means transfers a position error variable from the programmable axis manager to the programmable logic controller that informs the programmable logic controller that at least one of the servo driven packaging mechanisms has failed to reach a position within an allotted period of time.

30. A packaging machine as claimed in claim 1 wherein the communication means transfers a torque error variable from the programmable axis manager to the programmable logic controller that informs the programmable logic controller that at least one of the servomotors driving the plurality of servo driven packaging stations requires an excessive amount of torque to execute a predetermined movement.

31. A packaging machine comprising:
a plurality of servo driven packaging stations, each of the packaging stations executing one or more processes to fill and seal a carton and having one or more servomotors associated therewith;
a plurality of servo amplifiers, each of the servo amplifiers being connected to a respective servomotor for control of the respective servomotor;
a programmable axis manager connected to control the plurality of servo amplifiers, the programmable axis manager including PAM program memory and dual port memory;
a programmable logic controller connected to receive and transmit input/output signals associated with the plurality of packaging stations, the programmable logic controller including programmable logic controller program memory, the programmable axis manager and the programmable logic controller being connected to a common communication bus, the programmable logic controller accessing the dual port memory over the common communication bus; and
communication means for transferring data variable values between the programmable logic controller and the programmable axis manager over the common bus using predetermined fingerprints assigned to each variable value, the communication means comprising the dual port memory, code in the programmable logic controller program memory, and code in the programmable axis manager program memory.

32. A packaging machine as claimed in claim 31 and further comprising initialization means for placing the programmable axis manager and the programmable logic controller in a predetermined initialized state.

33. A packaging machine as claimed in claim 32 wherein the initialization means comprises:
exchanging means for exchanging selected CRC values between the programmable axis manager and programmable logic controller, the selected CRC values identifying which variables are to be used in communications between the programmable axis manager and programmable logic controller at runtime; and assigning means for assigning the predetermined fingerprints corresponding to the selected CRC values, the predetermined fingerprints being used to identify each variable in subsequent communications between the programmable logic controller and programmable axis manager at runtime.

34. A packaging machine as claimed in claim 31 wherein the communication means comprises:
transmit flag memory disposed in the dual port memory for storing a digital signal indicating to the programmable axis manager that the programmable logic controller has a data variable to send to the programmable axis manager;
receive data memory disposed in the dual port memory for storing the fingerprint and associated data variable that is to be sent from the programmable logic controller;
address memory disposed in the dual port memory for identifying the start address location of the receive data memory to which the programmable logic controller is to write the predetermined fingerprint and associated data variable that is to be sent by the programmable logic controller; and
transfer means for transferring the predetermined fingerprint and the associated data variable to the receive data memory address locations identified in the address memory.

35. A packaging machine as claimed in claim 31 wherein the communication means comprises:
programmable axis manager transmit flag memory disposed in the dual port memory for storing a digital signal indicating to the programmable logic controller that the programmable axis manager has a data variable to send to the programmable logic controller;
transmit data memory disposed in the dual port memory for storing the fingerprint and associated data variable that is to be sent to the programmable logic controller;
address memory disposed in the dual port memory for identifying the start address location of the transmit data memory from which the programmable logic controller is to read the predetermined fingerprint and associated data variable that is to be sent to the programmable logic controller; and
transfer means for transferring the predetermined fingerprint and the associated data variable from the receive data memory address locations identified in the address memory to the programmable logic controller.

36. A packaging machine as claimed in claim 31 wherein the communication means transfers a system production variable from the programmable logic controller to the programmable axis manager that instructs the programmable axis manager to control the plurality of servo driven packaging stations to execute a continuous production cycle.

37. A packaging machine as claimed in claim 31 wherein the communication means transfers a system production stop variable from the programmable logic controller to the programmable axis manager that instructs the programmable axis manager to control the plurality of servo driven packaging stations to stop execution of a continuous production cycle.

38. A packaging machine as claimed in claim 31 wherein the communication means transfers a system step production variable from the programmable logic controller to the programmable axis manager that instructs the programmable logic controller to control the plurality of servo driven packaging stations to execute a single production cycle.

39. A packaging machine as claimed in claim 31 wherein the communication means transfers a home variable from the programmable logic controller to the programmable axis manager that instructs the programmable axis manager to place one or more of the servo driven packaging stations at a predetermined reference position.

40. A packaging machine as claimed in claim 31 wherein the communication means transfers at least one power on variable from the programmable axis manager to the programmable logic controller that informs the programmable logic controller that power is supplied to at least one servo driven packaging mechanism.

41. A packaging machine as claimed in claim 31 wherein the communication means transfers a position error variable from the programmable axis manager to the programmable logic controller that informs the programmable logic controller that at least one of the servo driven packaging mechanisms has failed to reach a position within an allotted period of time.

42. A packaging machine as claimed in claim 31 wherein the communication means transfers a torque error variable from the programmable axis controller to the programmable logic controller that informs the programmable logic controller that at least one of the servomotors driving the plurality of servo driven packaging stations requires an excessive amount of torque to execute a predetermined movement.

* * * * *